US011503175B2

(12) United States Patent
Morimoto

(10) Patent No.: US 11,503,175 B2
(45) Date of Patent: Nov. 15, 2022

(54) DOCUMENT FEED DEVICE AND IMAGE FORMING APPARATUS INCLUDING THE SAME

(71) Applicant: SHARP KABUSHIKI KAISHA, Sakai (JP)

(72) Inventor: Yasumasa Morimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/462,488

(22) Filed: Aug. 31, 2021

(65) Prior Publication Data
US 2022/0094807 A1 Mar. 24, 2022

(30) Foreign Application Priority Data
Sep. 24, 2020 (JP) .............................. JP2020-159625

(51) Int. Cl.
*H04N 1/04* (2006.01)
*H04N 1/12* (2006.01)
*H04N 1/00* (2006.01)

(52) U.S. Cl.
CPC ....... *H04N 1/1215* (2013.01); *H04N 1/00806* (2013.01)

(58) Field of Classification Search
None
See application file for complete search history.

(56) References Cited

U.S. PATENT DOCUMENTS

| 6,254,078 | B1 * | 7/2001 | Taruki | G03G 15/60 271/265.01 |
| 2011/0254218 | A1 * | 10/2011 | Maeno | B65H 9/006 271/273 |
| 2013/0321885 | A1 * | 12/2013 | Adachi | H04N 1/00631 358/498 |
| 2015/0274460 | A1 * | 10/2015 | Hirata | B41J 13/0045 271/3.2 |
| 2017/0108814 | A1 * | 4/2017 | Morimoto | B65H 5/062 |
| 2017/0240364 | A1 * | 8/2017 | Omori | B65H 3/0676 |

FOREIGN PATENT DOCUMENTS

JP H07-090942 B2 10/1995

* cited by examiner

Primary Examiner — Dung D Tran
(74) Attorney, Agent, or Firm — ScienBiziP, P.C.

(57) ABSTRACT

In a document feed device, in at least either one of a pair of first upstream conveyance rollers and a pair of first downstream conveyance rollers, at least a driven roller includes a plurality of driven rollers provided in a rotation axis direction, a first pressure load of a central driven roller against a drive roller is larger than a second pressure load of both-side driven rollers against drive rollers, and the second pressure load of the both-side driven rollers against the drive rollers is smaller than a third pressure load of a driven roller against a drive roller in a pair of second conveyance rollers other than the pair of first upstream conveyance rollers and the pair of first downstream conveyance rollers among a plurality of pairs of conveyance rollers.

9 Claims, 23 Drawing Sheets

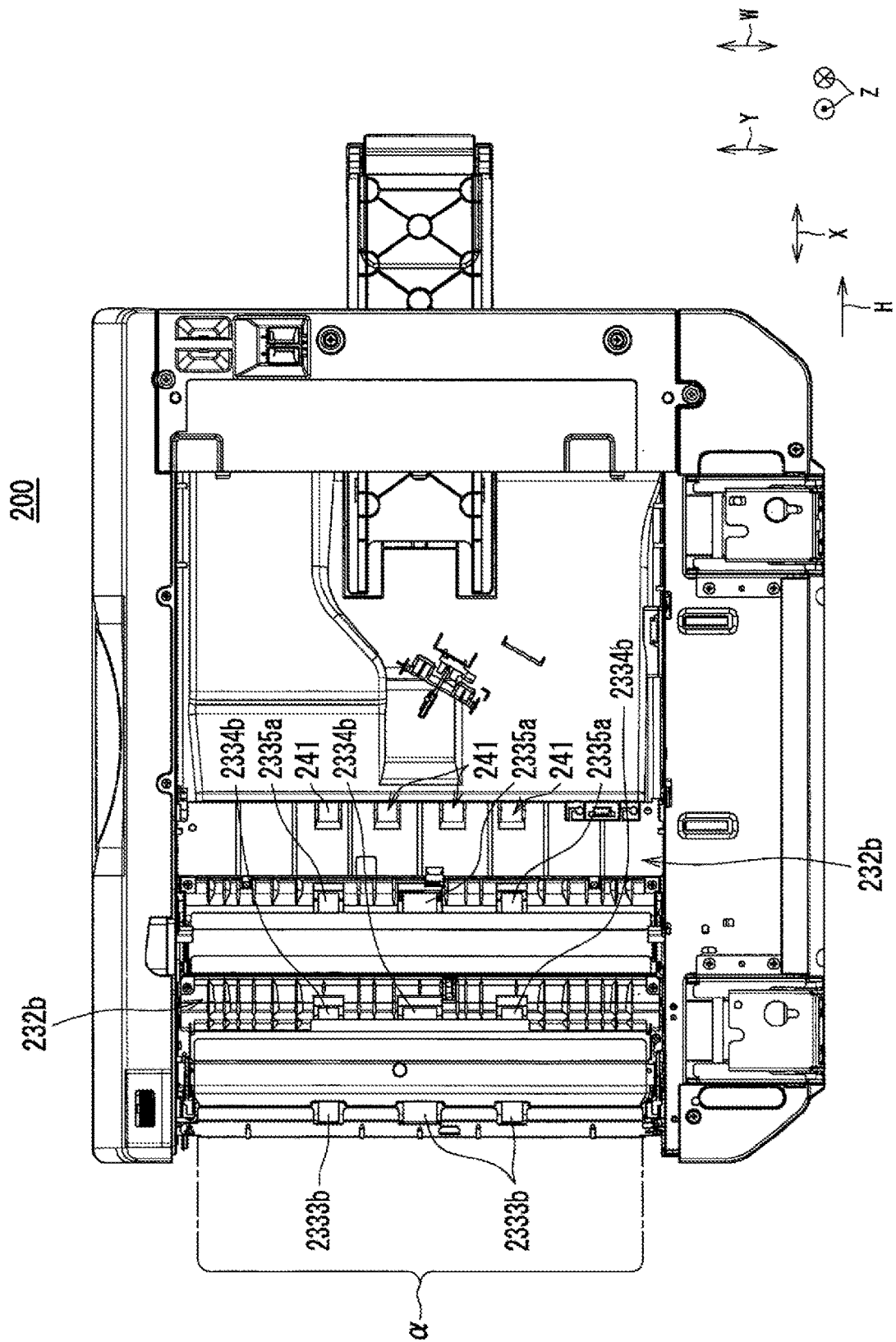

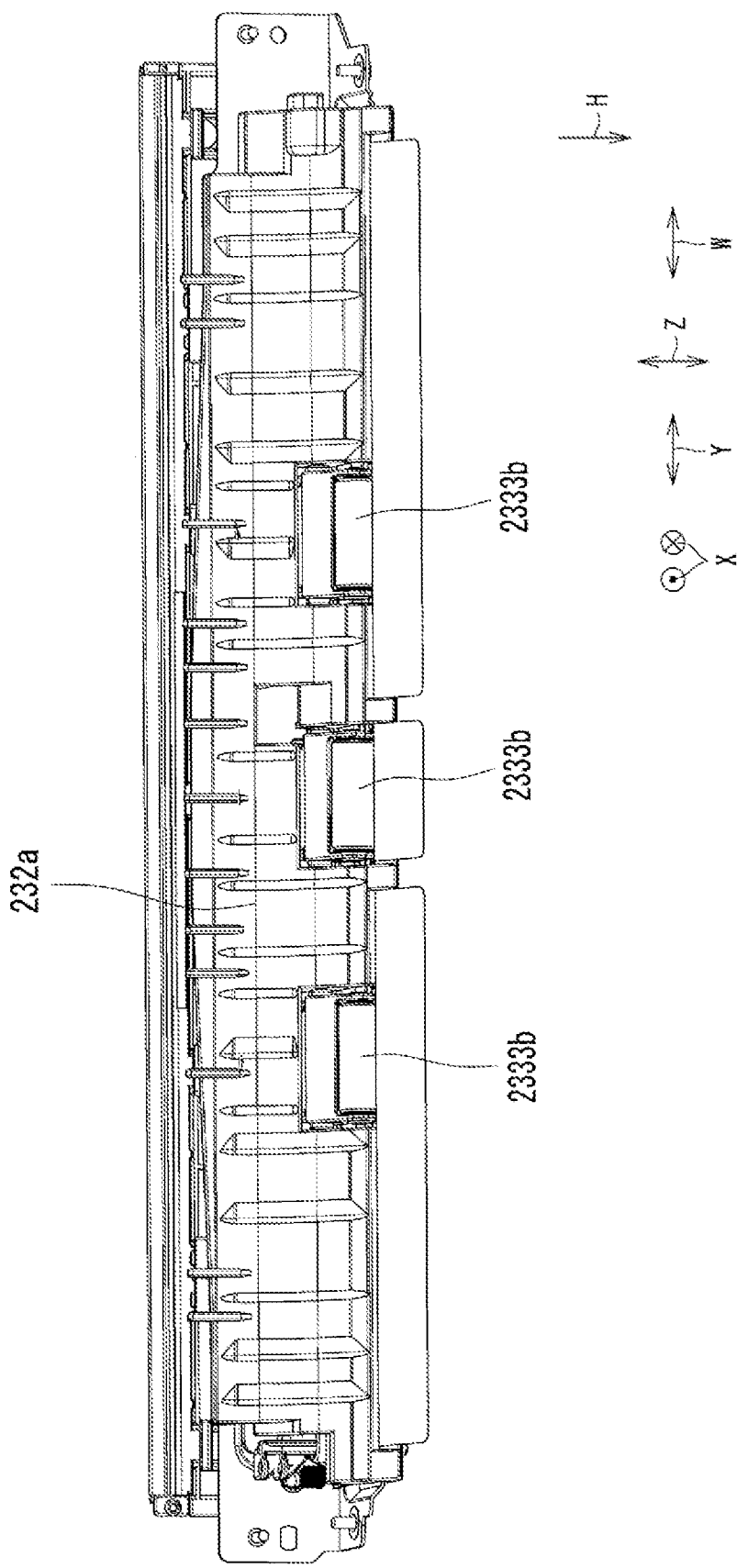

DOCUMENT FEED DEVICE AND IMAGE FORMING APPARATUS INCLUDING THE SAME

BACKGROUND OF THE INVENTION

Field of the Invention

The present invention relates to a document feed device and an image forming apparatus, such as a copier, a multi-function peripheral, or a facsimile apparatus, including the document feed device.

Description of the Background Art

In a document feed device included in an image forming apparatus, typically, a plurality of pairs of conveyance rollers is provided to convey a document along a conveyance path having a read position for reading an image of the document. The plurality of pairs of conveyance rollers includes a drive roller that is rotationally driven and a driven roller that is accordingly rotated by the drive roller. The plurality of pairs of conveyance rollers includes, in the conveying direction of the document, a pair of first upstream conveyance rollers (pre-reading rollers) located closest to the read position on the upstream side and a pair of first downstream conveyance rollers (post-reading rollers) located closest to the read position on the downstream side. In at least either one of the pair of first upstream conveyance rollers and the pair of first downstream conveyance rollers, at least a driven roller includes a plurality of driven rollers provided in a rotation axis direction. The individual driven rollers are pressed against the drive rollers with a predetermined pressure load by biasing members such as coil springs.

In this type of document feed device, in order to convey a thick document (e.g., business card) having the smallest size, the plurality of pairs of conveyance rollers are provided in the conveyance path such that the distance between the adjacent pairs of conveyance rollers is smaller than the smallest size (e.g., business card size). The loads of the individual driven rollers provided in the rotation axis direction are set to the value for allowing a thick document having the smallest size to be conveyed, i.e., a value larger than the value for conveying a standard document (e.g., regular sheet) having a size larger than the smallest size, and all the loads are set to be identical. In this case, there is a reduction in the conveyance performance for standard documents (e.g., regular sheets) having a size larger than the smallest size (e.g., business card size).

Regarding this point, Japanese Examined Patent Application Publication No. 7-90942 describes the configuration in which a self-weighting roller is pressed due to its own weight and the conveyance force of a secondary conveyance roller is smaller than that of a primary conveyance roller against which a sheet feed roller is pressed due to the spring force of a roller pressing spring.

With regard to the configuration described in Japanese Examined Patent Application Publication No. 7-90942, however, there is no description regarding the conveyance performance for a thick document (e.g., business card) having the smallest size, and there is no disclosure or suggestion regarding ensuring the conveyance performance for a document regardless of the type and size of the document.

Therefore, it is an object of the present invention to provide a document feed device and an image forming apparatus including the document feed device with which it is possible to ensure the conveyance performance for a document regardless of the type and size of the document.

SUMMARY OF THE INVENTION

In order to solve the above-described issue, a document feed device according to the present invention is a document feed device including a plurality of pairs of conveyance rollers provided to convey a document along a conveyance path having a read position for reading an image of the document, wherein the plurality of pairs of conveyance rollers includes a drive roller that is rotationally driven and a driven roller that is accordingly rotated by the drive roller and includes, in a conveying direction of the document, a pair of first upstream conveyance rollers located closest to the read position on an upstream side and a pair of first downstream conveyance rollers located closest to the read position on a downstream side, in at least either one of the pair of first upstream conveyance rollers and the pair of first downstream conveyance rollers, at least the driven roller includes a plurality of driven rollers provided in a rotation axis direction, a first pressure load of a central driven roller, which is located in a center area in the rotation axis direction, against the drive roller is larger than a second pressure load of both-side driven rollers, which are located at both sides of the central driven roller, against the drive rollers, and the second pressure load of the both-side driven rollers against the drive rollers is smaller than a third pressure load of the driven roller against the drive roller in a pair of second conveyance rollers other than the pair of first upstream conveyance rollers and the pair of first downstream conveyance rollers among the plurality of pairs of conveyance rollers. Furthermore, an image forming apparatus according to the present invention includes the document feed device according to the present invention.

According to the present invention, it is possible to ensure the conveyance performance for a document regardless of the type and size of the document.

BRIEF DESCRIPTION OF THE DRAWINGS

FIG. 4B is a bottom view illustrating a state where a lower conveyance cover member is removed from the document feed device illustrated in FIG. 1.

FIG. 5A is a right side view illustrating a state where a component is removed to expose a conveyance guide outside a part at a driven roller in a pair of first upstream conveyance rollers in the document feed device illustrated in FIG. 1.

DESCRIPTION OF THE PREFERRED EMBODIMENTS

Figure 1:
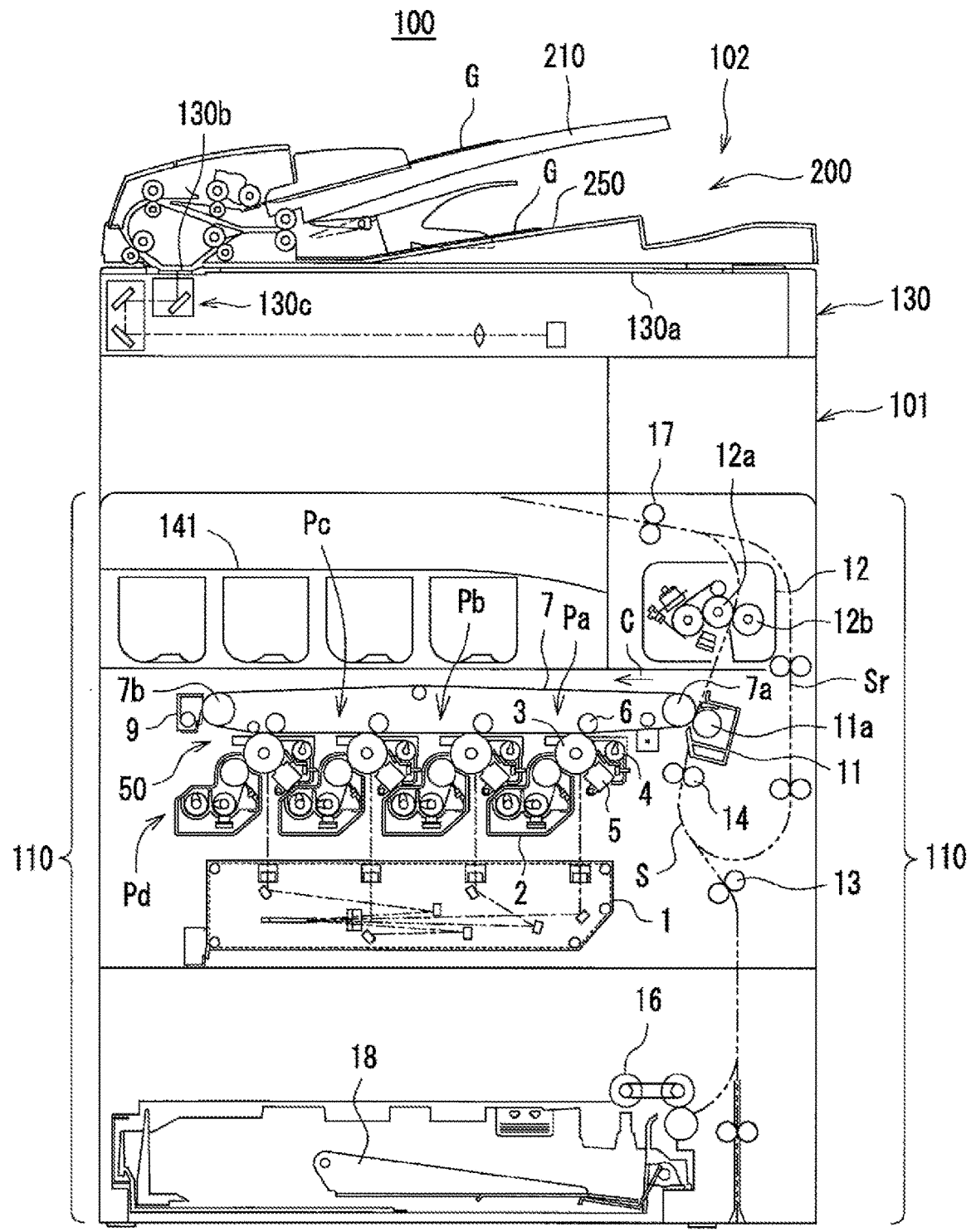
FIG. 1 is a cross-sectional view illustrating a schematic configuration of an image forming apparatus according to the present embodiment.

Embodiments according to the present invention are described below with reference to the drawings. In the following description, the same parts are denoted by the same reference numeral. The names and the functions thereof are also the same. Therefore, the detailed descriptions thereof are not repeated.

Image Forming Apparatus

FIG. 1 is a cross-sectional view illustrating a schematic configuration of an image forming apparatus 100 according to the present embodiment. In FIG. 1, a reference mark X denotes a horizontal direction (left-right direction), a reference mark Y denotes a width direction (front-back direction), and a reference mark Z denotes a vertical direction (height direction).

The image forming apparatus 100 is a multifunction peripheral having a copier function, a scanner function, a facsimile function, and a printer function to transmit an image of a document G read by an image read device 102 to an external unit. The image forming apparatus 100 forms a full-color or single-color image on a sheet (recording material) based on the image of the document G read by the image read device 102 or an image received from an external unit. The image forming apparatus 100 may form a monochrome image.

The image read device 102 includes a document feed device 200. The document feed device 200 is provided above an image read unit 130 and is supported so as to be opened and closed with respect to the image read unit 130. The document feed device 200 sequentially conveys the one or more documents G one by one. The image read device 102 reads the document G that is conveyed one by one by the document feed device 200 among the one or more documents G. The image read device 102 includes a document placement table 130a (platen) where the document G is placed and a placed document read function for reading the document G placed on the document placement table 130a. In the image forming apparatus 100, when the document feed device 200 is open, the document placement table 130a above the image read unit 130 is exposed so that the document G may be placed by hand. The document feed device 200 includes a document placement tray 210 where the document G is placed and a document discharge tray 250 where the externally discharged document G is placed. The image read device 102 has a conveyed-document read function for reading the document G conveyed by the document feed device 200. The document feed device 200 conveys the document G placed on the document placement tray 210 to above a document read unit 130b in the image read unit 130. The image read unit 130 reads the document G placed on the document placement table 130a by scanning of an optical scanning system 130c or reads the document G conveyed by the document feed device 200 so as to generate image data.

The image forming apparatus 100 includes an image forming unit 110. The image forming unit 110 includes an optical scanning device 1, a development device 2, a photoconductor drum 3, a drum cleaning device 4, a charge device 5, an intermediate transfer belt 7, a fuser device 12, a sheet conveyance path S, a sheet feed cassette 18, and a sheet discharge tray 141 (in-chassis discharge tray).

The image forming unit 110 handles the image data corresponding to a color image using colors of black (K), cyan (C), magenta (M), and yellow (Y) or a monochrome image using a single color (e.g., black). To form four types of toner images, an image transfer unit 50 of the image forming apparatus 100 includes the four development devices 2, the four photoconductor drums 3, the four drum cleaning devices 4, and the four charge devices 5, which correspond to black, cyan, magenta, and yellow, respectively, and form four image stations Pa, Pb, Pc, and Pd.

The optical scanning device 1 exposes the surface of the photoconductor drum 3 to form an electrostatic latent image. The development device 2 develops an electrostatic latent image on the surface of the photoconductor drum 3 to form a toner image on the surface of the photoconductor drum 3. The drum cleaning device 4 removes and collects residual toner from the surface of the photoconductor drum 3. The charge device 5 uniformly charges the surface of the photoconductor drum 3 so as to have a predetermined potential. The series of operations described above cause a toner image of each color to be formed on the surface of each of the photoconductor drums 3.

An intermediate transfer roller 6 is disposed above the photoconductor drum 3 via the intermediate transfer belt 7. The intermediate transfer belt 7 is stretched between a transfer drive roller 7a and a transfer driven roller 7b to move circumferentially in the direction of an arrow mark C. In the image forming apparatus 100, the residual toner is removed and collected by the belt cleaning device 9, and the toner images of the respective colors formed on the surfaces of the respective photoconductor drums 3 are sequentially transferred and superimposed so that a color toner image is formed on the surface of the intermediate transfer belt 7.

A transfer roller 11a of a secondary transfer unit 11 forms a nip area with the intermediate transfer belt 7 to nip and convey the sheet, which is conveyed through the sheet conveyance path S, in the nip area. The toner image on the surface of the intermediate transfer belt 7 is transferred onto the sheet when passing through the nip area, and the sheet is conveyed to the fuser device 12.

The fuser device 12 includes a fuser roller 12a and a pressure roller 12b that rotate with a sheet interposed therebetween. The fuser device 12 applies heat and pressure to the sheet having the toner image transferred thereon when the sheet is sandwiched between the fuser roller 12a and the pressure roller 12b so as to fix the toner image to the sheet.

The sheet feed cassette 18 is a cassette that accumulates sheets to be used for image formation and is provided under the optical scanning device 1. A sheet is pulled out of the sheet feed cassette 18 by a sheet pickup roller 16 and is conveyed to the sheet conveyance path S. After the sheet is conveyed to the sheet conveyance path S, the sheet is passed through the secondary transfer unit 11 and the fuser device 12, is conveyed to a discharge roller 17, and is discharged onto the sheet discharge tray 141. A conveyance roller 13, a registration roller 14, and a discharge roller 17 are provided in the sheet conveyance path S. The conveyance roller 13 promotes the conveyance of the sheet. The registration roller 14 temporarily stops the sheet and aligns the leading edge of the sheet. The registration roller 14 conveys the temporarily stopped sheet in synchronized timing with the toner image on the intermediate transfer belt 7. The toner image on the intermediate transfer belt 7 is transferred onto the sheet in the nip area between the intermediate transfer belt 7 and the transfer roller 11a. Although FIG. 1 illustrates the one sheet feed cassette 18, this is not a limitation, and the configuration may be such that the plurality of sheet feed cassettes 18 is provided.

When an image is formed on the back side of the sheet as well as the front side thereof, the image forming apparatus 100 conveys the sheet in the reverse direction from the discharge roller 17 to a sheet reversal path Sr. The image forming apparatus 100 reverses the front and back sides of the sheet conveyed in the reverse direction and guides the sheet again to the registration roller 14. The image forming apparatus 100 forms an image on the back side of the sheet guided to the registration roller 14 in the same manner as on the front side and delivers the sheet out to the sheet discharge tray 141.

The image read unit 130 is provided on the upper surface of an image forming apparatus main body 101. The document feed device 200 is mounted on the image read unit 130.

Document Feed Device

First Embodiment

Figure 2:
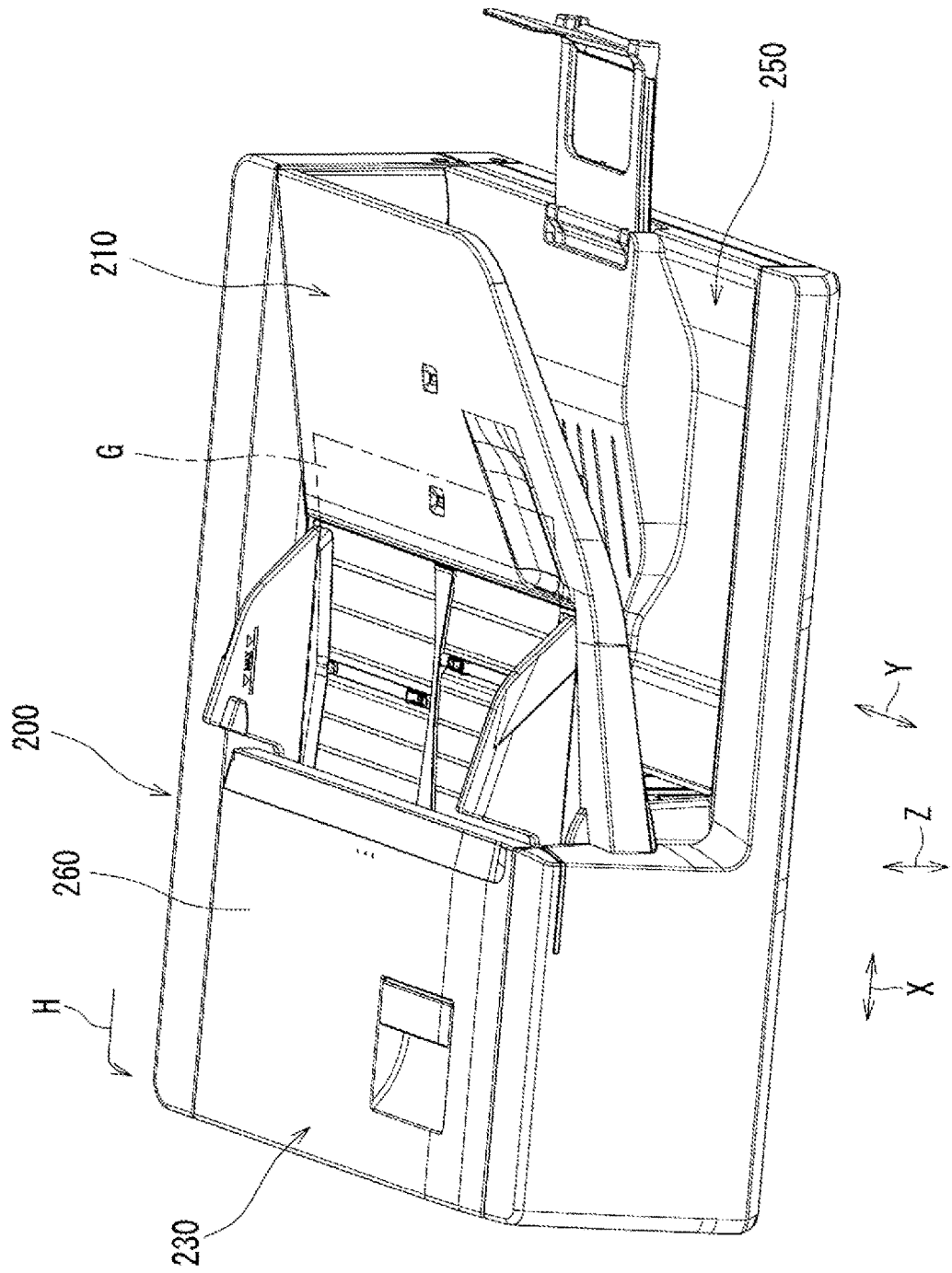
FIG. 2 is a perspective view illustrating a document feed device according to a first embodiment.
Figure 3:
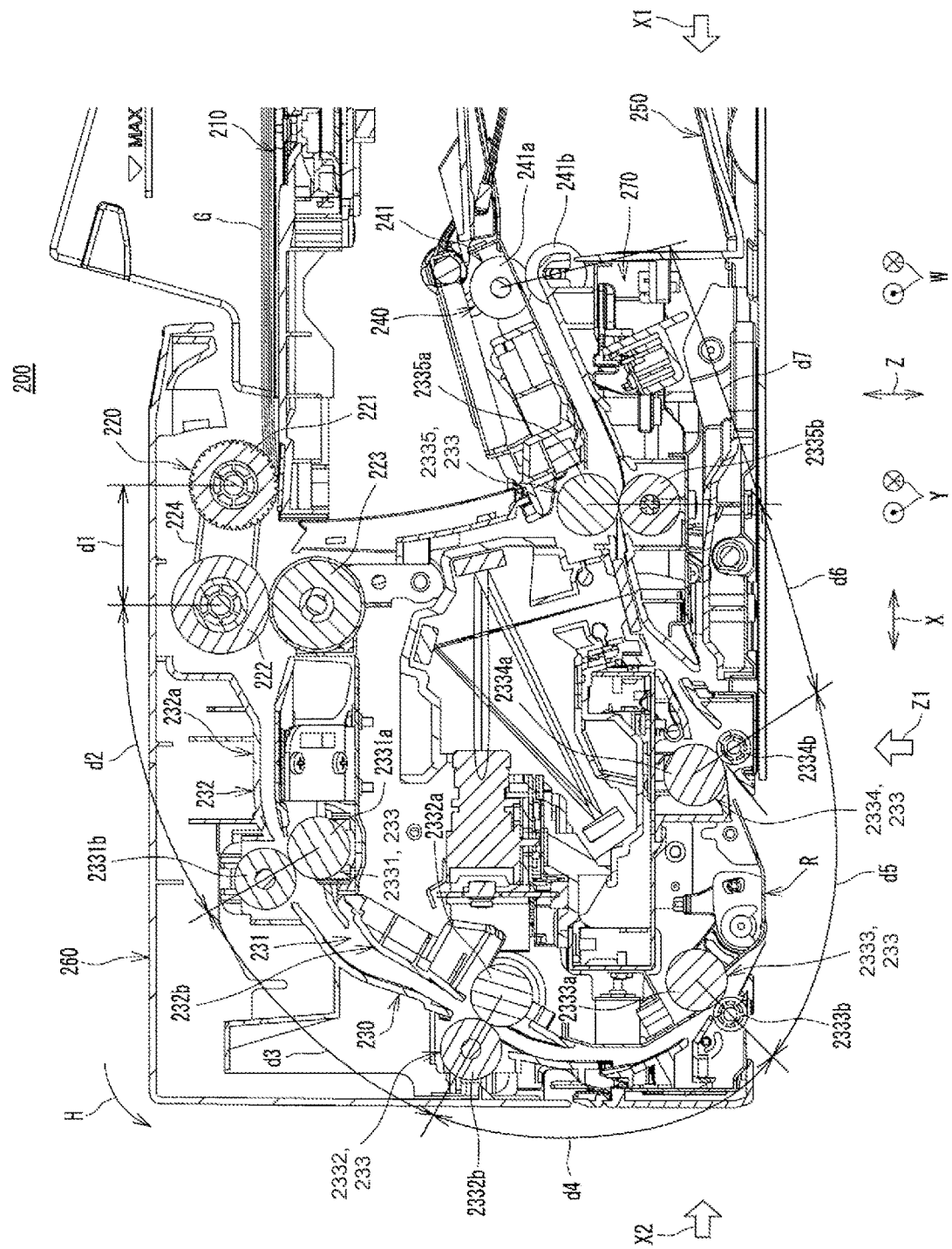
FIG. 3 is an enlarged cross-sectional view illustrating an enlarged part at a conveyance path in the document feed device according to the first embodiment.

FIG. 2 is a perspective view illustrating the document feed device 200 according to a first embodiment. FIG. 3 is an enlarged cross-sectional view illustrating an enlarged part at a conveyance path 231 in the document feed device 200 according to the first embodiment.

Figure 4A:
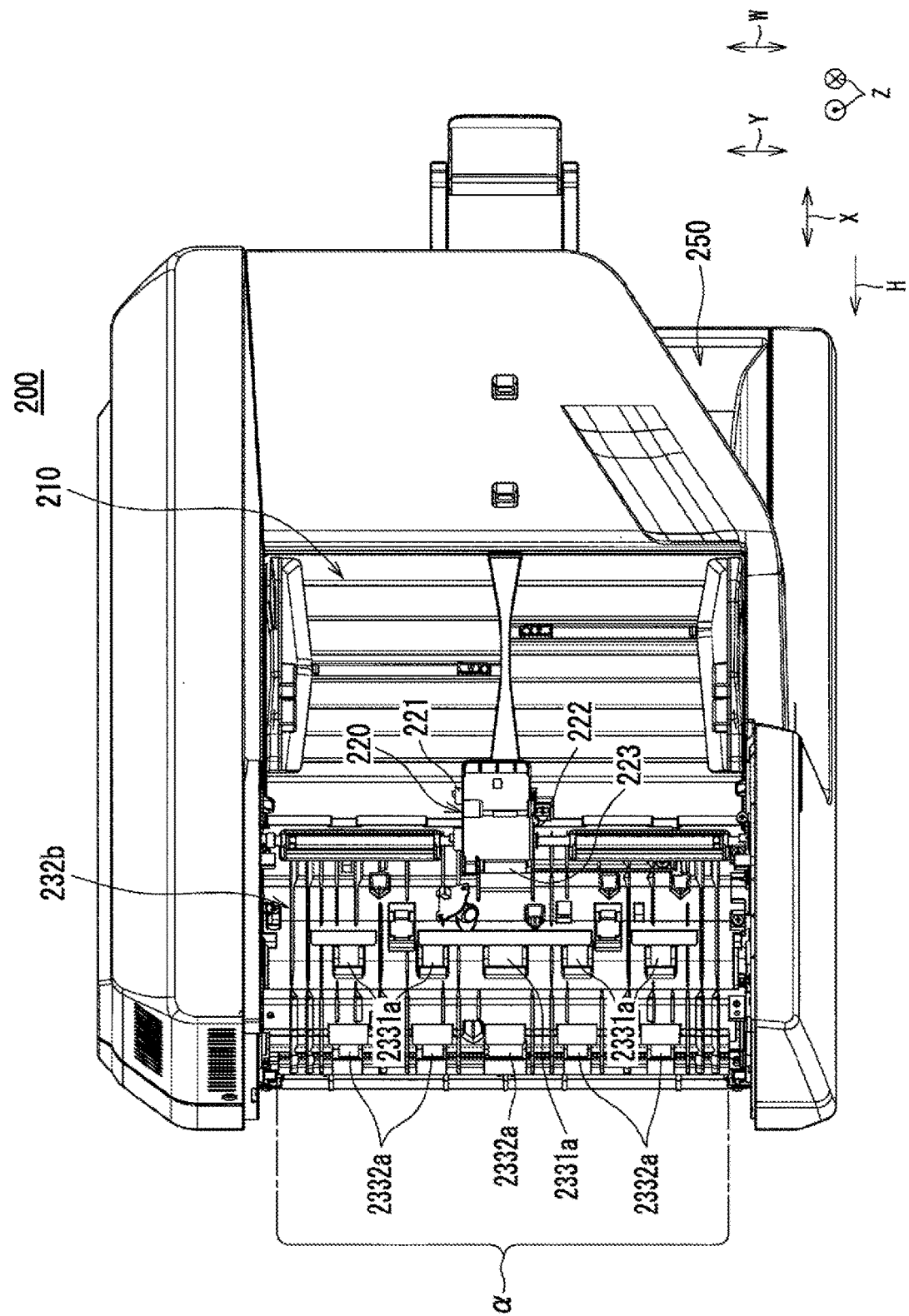
FIG. 4A is a plan view illustrating a state where an upper conveyance cover member is removed from the document feed device illustrated in FIG. 1.

FIG. 4A is a plan view illustrating a state where an upper conveyance cover member 260 is removed from the document feed device 200 illustrated in FIG. 1. FIG. 4B is a bottom view illustrating a state where a lower conveyance cover member 270 is removed from the document feed device 200 illustrated in FIG. 1.

Figure 5B:
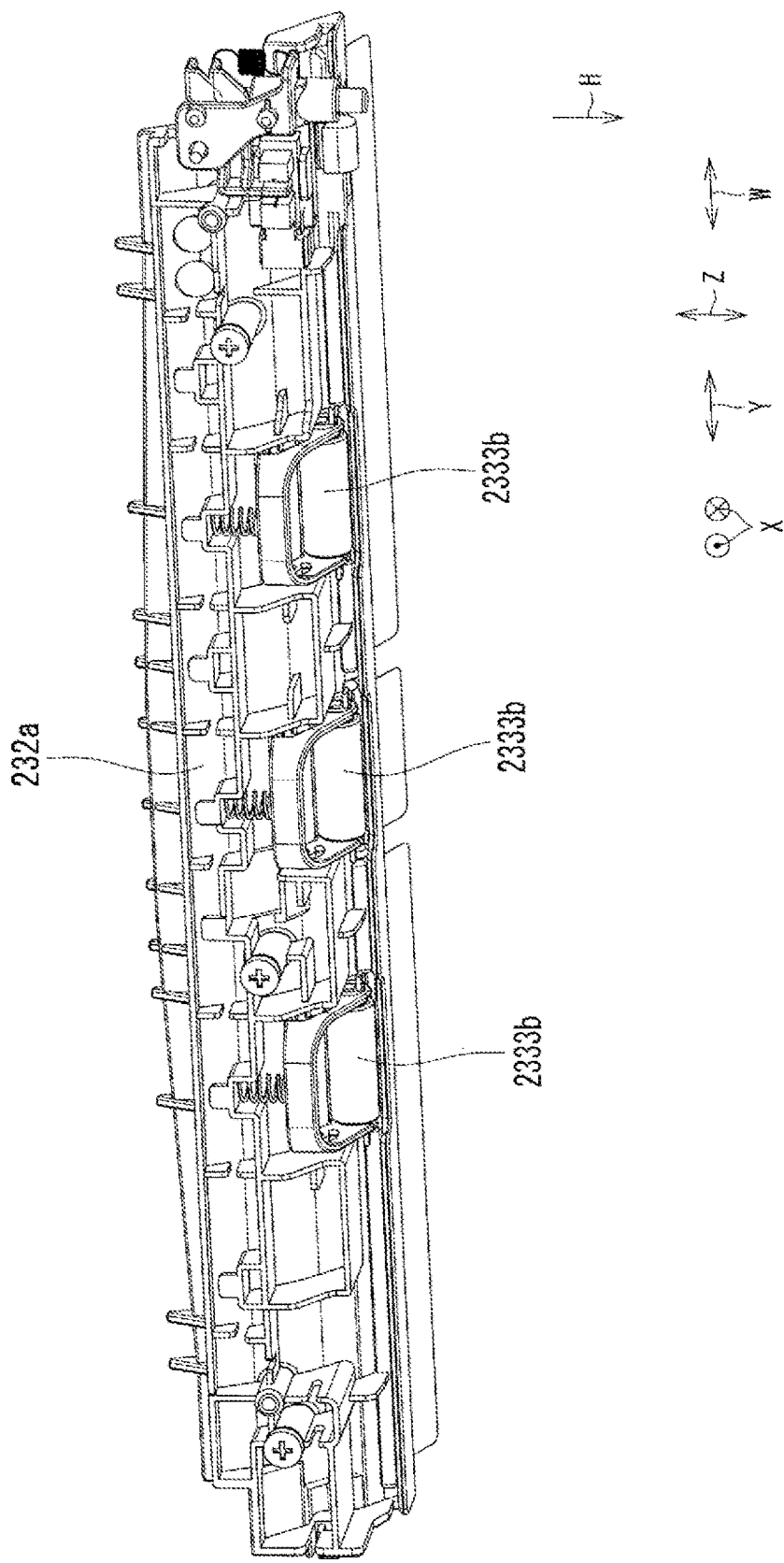
FIG. 5B is a perspective view from a left side illustrating a state where a component is removed to expose the conveyance guide outside the part at the driven roller in the pair of first upstream conveyance rollers in the document feed device illustrated in FIG. 1.
Figure 6A:
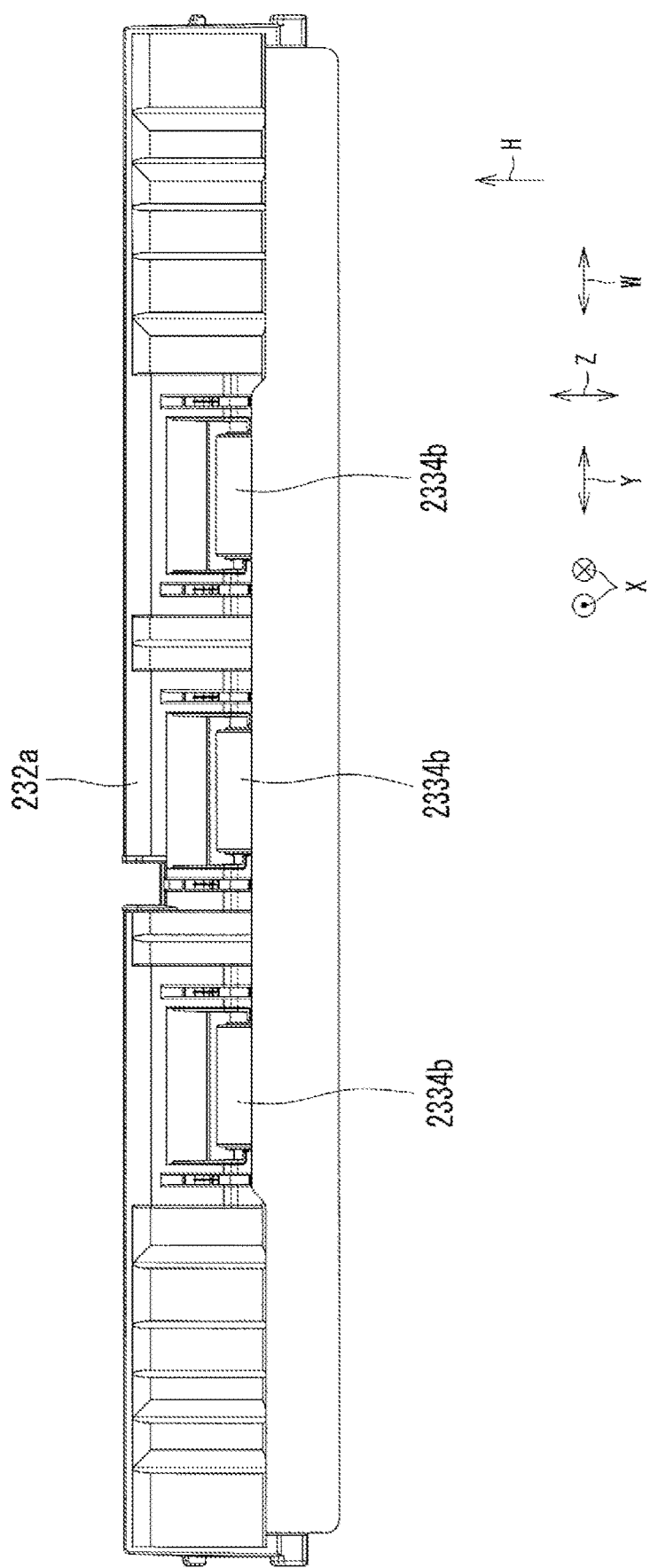
FIG. 6A is a plan view illustrating a state where a component is removed to expose the conveyance guide outside a part at a driven roller in a pair of first downstream conveyance rollers in the document feed device illustrated in FIG. 1.
Figure 6B:
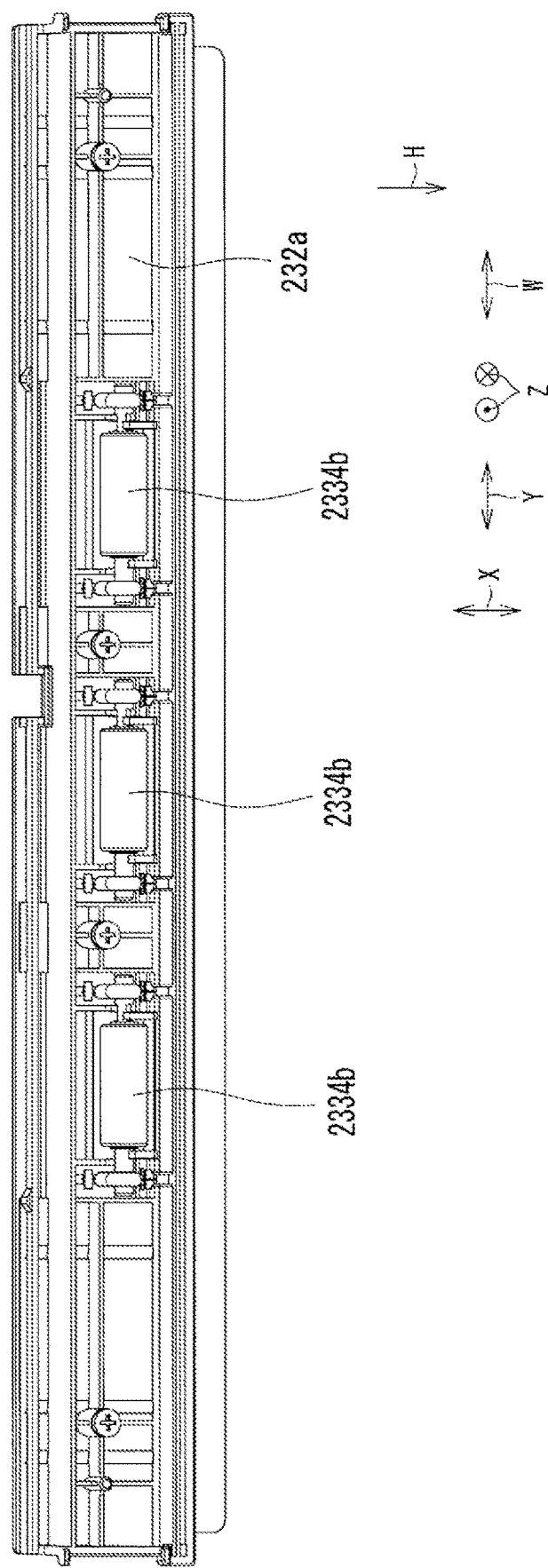
FIG. 6B is a bottom view illustrating a state where a component is removed to expose the conveyance guide outside the part at the driven roller in the pair of first downstream conveyance rollers in the document feed device illustrated in FIG. 1.

FIG. 5A is a right side view illustrating a state where a component is removed to expose a conveyance guide 232a outside a part at a driven roller 2333b in a pair of first upstream conveyance rollers (2333) in the document feed device 200 illustrated in FIG. 1. FIG. 5A is a view from an X1 direction in FIG. 3B. FIG. 5B is a perspective view from a left side illustrating a state where a component is removed to expose the conveyance guide 232a outside the part at the driven roller 2333b in the pair of first upstream conveyance rollers (2333) in the document feed device 200 illustrated in FIG. 1. FIG. 5B is a view from an X2 direction in FIG. 3B. FIG. 6A is a plan view illustrating a state where a component is removed to expose the conveyance guide 232a outside a part at a driven roller 2334b in a pair of first downstream conveyance rollers (2334) in the document feed device 200 illustrated in FIG. 1. FIG. 6A is a view from the X2 direction in FIG. 3B. FIG. 6B is a bottom view illustrating a state where a component is removed to expose the conveyance guide 232a outside the part at the driven roller 2334b in the pair of first downstream conveyance rollers (2334) in the document feed device 200 illustrated in FIG. 1. FIG. 6B is a view from a Z1 direction in FIG. 3B.

Figure 7:
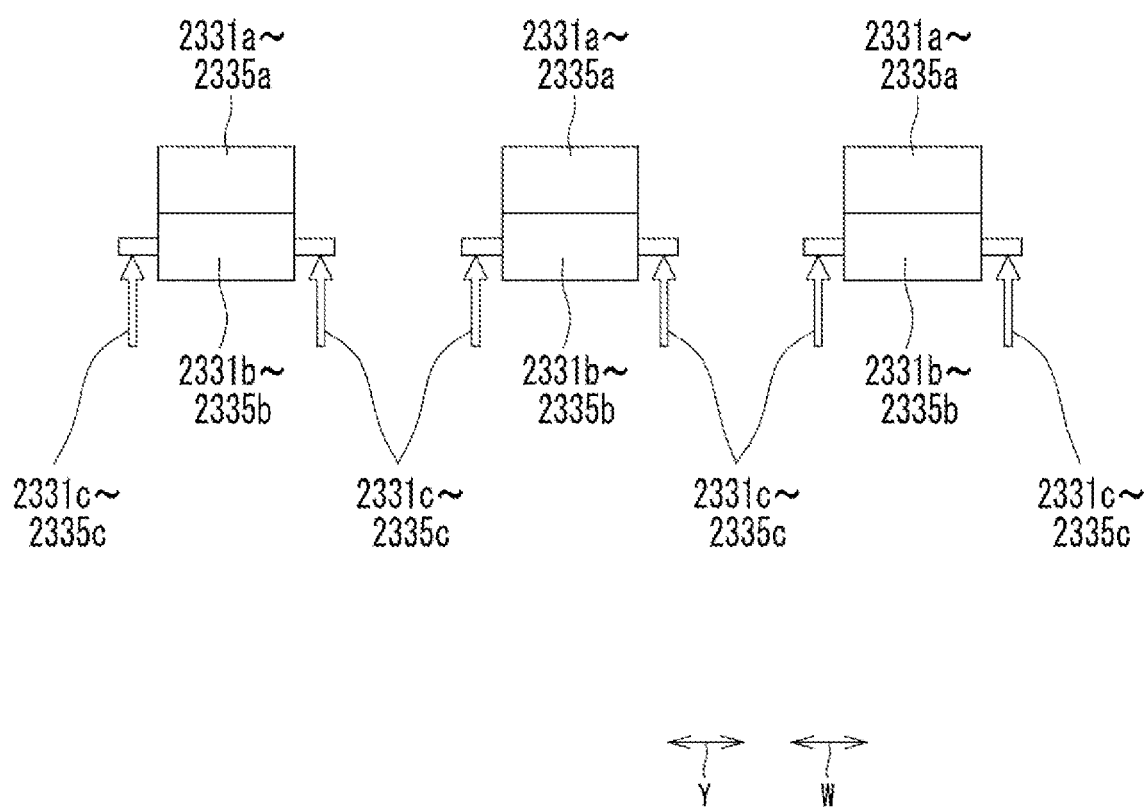
FIG. 7 is a schematic view illustrating a state where drive rollers are pressed against driven rollers.
Figure 8A:
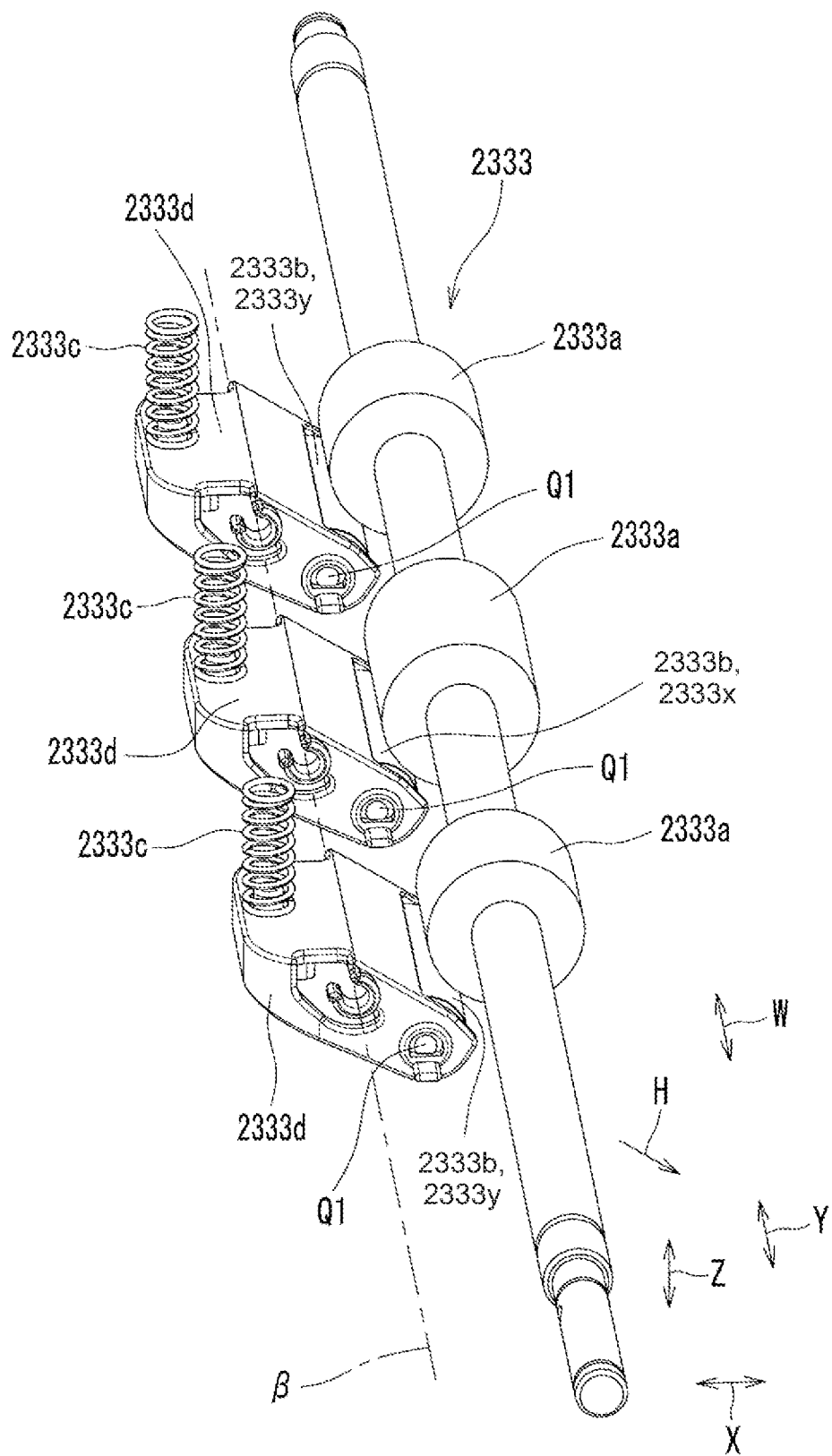
FIG. 8A is a perspective view illustrating the pair of first upstream conveyance rollers.
Figure 8B:
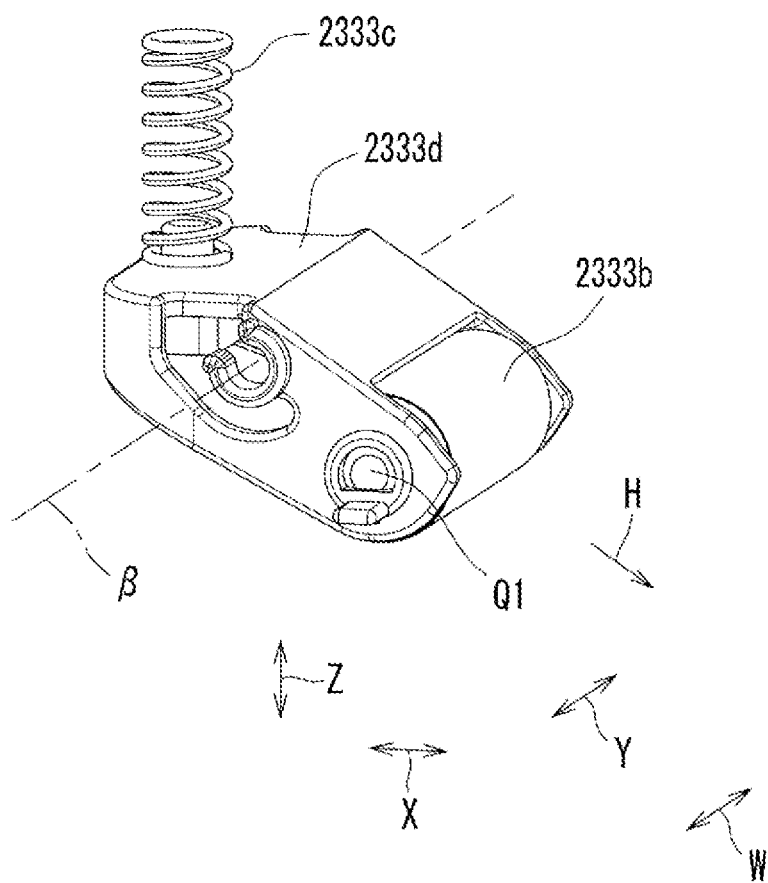
FIG. 8B is a perspective view illustrating the driven roller in the pair of first upstream conveyance rollers.
Figure 9A:
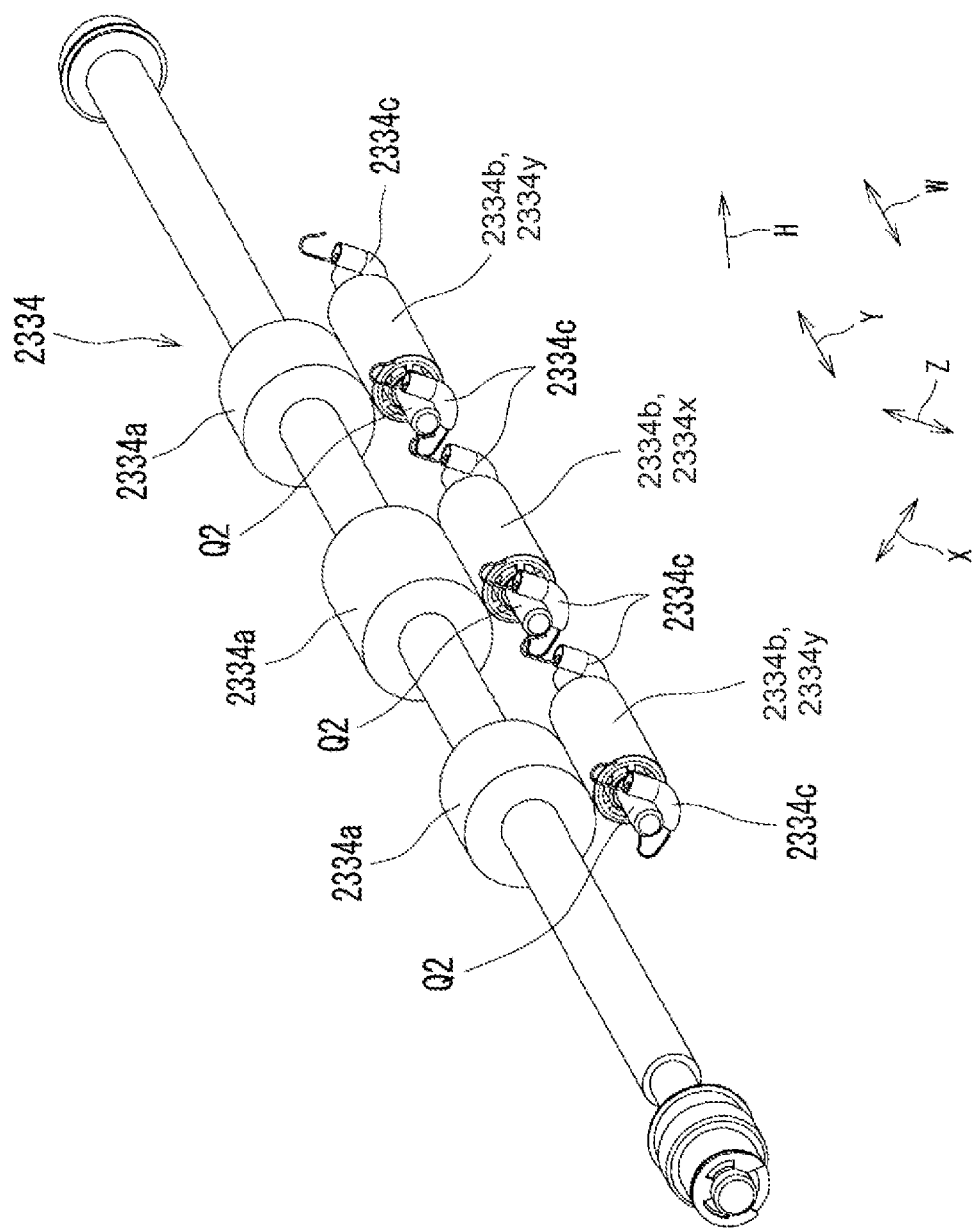
FIG. 9A is a perspective view illustrating the pair of first downstream conveyance rollers without a support member for the driven roller.

FIG. 7 is a schematic view illustrating a state where drive rollers 2331a to 2335a are pressed against driven rollers 2331b to 2335b, respectively, by biasing members 2331c to 2335c. FIG. 8A is a perspective view illustrating the pair of first upstream conveyance rollers (2333). FIG. 8B is a perspective view illustrating the driven roller 2333b in the pair of first upstream conveyance rollers (2333). FIG. 9A is a perspective view illustrating the pair of first downstream conveyance rollers (2334) without a support member 2334d for the driven roller 2334b.

Figure 9B:
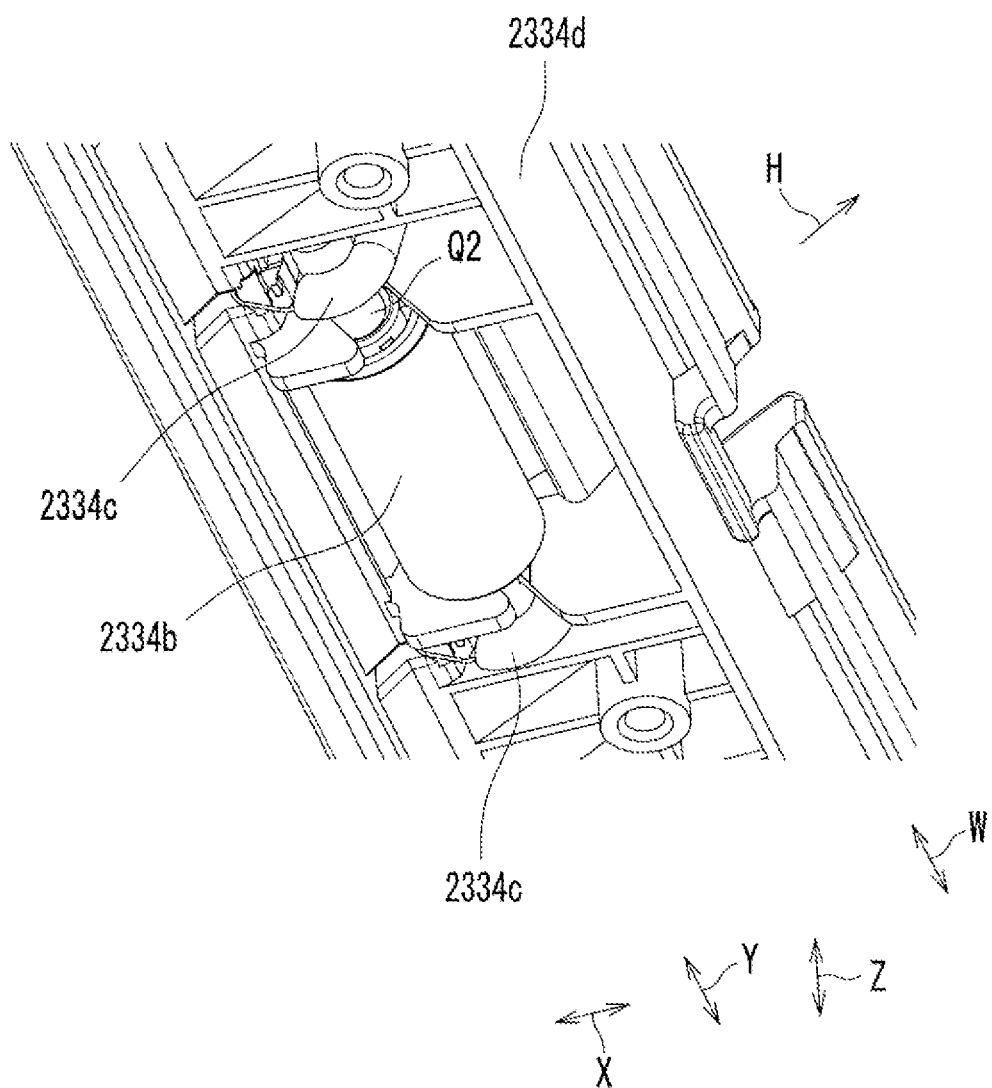
FIG. 9B is a perspective view illustrating the driven roller in the pair of first downstream conveyance rollers together with the support member.

FIG. 9B is a perspective view illustrating the driven roller 2334b in the pair of first downstream conveyance rollers (2334) together with the support member 2334d.

Figure 10:
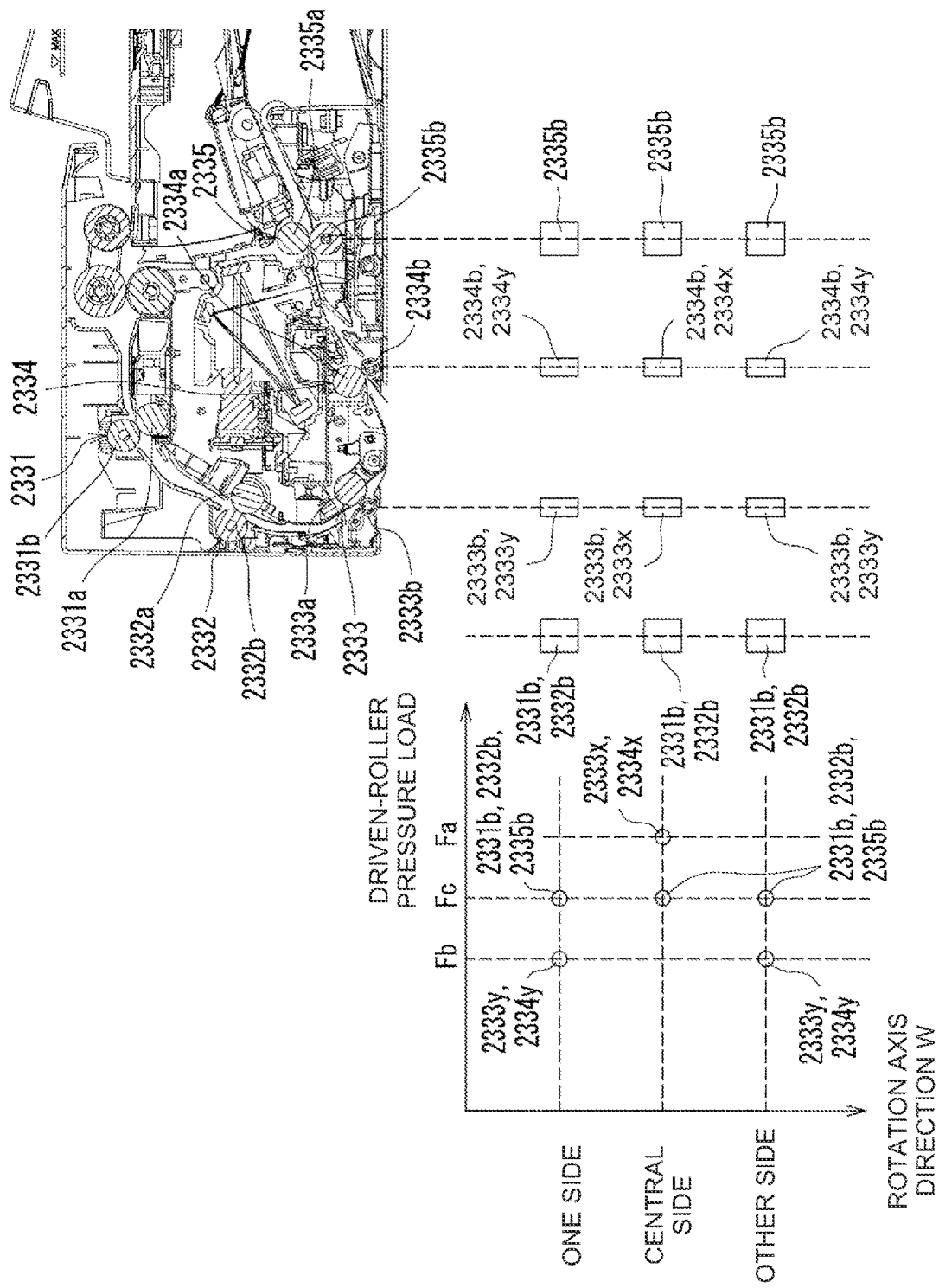
FIG. 10 is a schematic view illustrating a net of the driven roller in the pair of first upstream conveyance rollers, the driven roller in the pair of first downstream conveyance rollers, and driven rollers in pairs of second conveyance rollers together with a graph of loads.

FIG. 10 is a schematic view illustrating a net of the driven roller 2333b in the pair of first upstream conveyance rollers (2333), the driven roller 2334b in the pair of first downstream conveyance rollers (2334), and driven rollers (2331b, 2332b, and 2335b) in pairs of second conveyance rollers (2331, 2332, and 2335) together with a graph of loads.

The document feed device 200 includes the document placement tray 210, a document supply unit 220, a document conveyance unit 230, a document discharge unit 240, and the document discharge tray 250. The document placement tray 210 has the document G placed thereon. The document supply unit 220 supplies the document G placed on the document placement tray 210 one by one to the document conveyance unit 230. The document conveyance unit 230 conveys the document G supplied by the document supply unit 220 at a center reference of a document conveyance area α in a rotation axis direction W (see FIGS. 4A and 4B). The document discharge unit 240 discharges the document G conveyed by the document conveyance unit 230. The document discharge tray 250 has the document G discharged by the document discharge unit 240 stacked thereon. In the document feed device 200, the document placement tray 210 and the document discharge tray 250 are provided so as to be overlapped in the vertical direction.

Specifically, the document conveyance unit 230 includes a pair of conveyance guides 232 (232a and 232b) forming the conveyance path 231 and a pair of conveyance rollers 233 (conveyance roller pair). The plurality of pairs of conveyance rollers 233 is provided along the conveyance path 231 to convey the document G in the conveyance path 231. In this example, the plurality of pairs of conveyance rollers 233 includes first feed rollers 2331 to fifth feed rollers 2335.

The document supply unit 220 includes an intake roller 221 (pickup roller), a supply roller 222 (sheet feed roller), a separation member (a separation roller or a separation pad (a separation roller 223 in this example)), and a supply drive transmission mechanism 224.

The intake roller 221 draws the topmost document G among the documents G stacked on the document placement tray 210. The intake roller 221, the supply roller 222, and the separation roller 223 separate and convey the document G drawn by the intake roller 221 one by one. The supply roller 222 conveys the document G, drawn by the intake roller 221, one by one to the pair of conveyance guides 232 together with the separation roller 223. The separation roller 223 is provided to be opposed to the supply roller 222. The separation roller 223 may restrict the conveyance of the second and subsequent documents G from the top among the documents G stacked on the document placement tray 210 in a conveying direction H and may allow the conveyance of the lowest (last) document G in the conveying direction H. The supply drive transmission mechanism 224 includes a gear train or a timing pulley and a timing belt to transmit the rotational driving force, which is transmitted to the supply roller 222, to the intake roller 221. The intake roller 221, the supply roller 222, and the separation roller 223 are located at a center area (see FIG. 4A) of the document conveyance area α in the rotation axis direction W. This makes it possible to draw and supply the document G having the smallest size. The document supply unit 220 is conventionally known, and the descriptions for other detailed configurations are omitted.

The pair of conveyance guides 232 form the conveyance path 231 for the document G from the document supply unit 220 to the document discharge unit 240. The conveyance path 231 is formed so as to convey the document G substantially horizontally, make a U-turn downward, and then convey the document G obliquely upward. The conveyance path 231 includes, at the lowest portion, a read position R (see FIG. 3) at which an image of the document G is read.

The plurality of pairs of conveyance rollers 233 includes, in the conveying direction H of the document G, the pair of first upstream conveyance rollers (the third feed rollers 2333 in this example) located closest to the read position R on the upstream side and the pair of first downstream conveyance rollers (the fourth feed rollers 2334 in this example) located closest to the read position R on the downstream side. The plurality of pairs of conveyance rollers (the first feed rollers 2331 to the fifth feed rollers 2335) includes the drive rollers 2331a to 2335a and the driven rollers 2331b to 2335b. The drive rollers 2331a to 2334a are rotationally driven by a conveyance drive unit (brushless DC motor) (not illustrated) via a conveyance drive transmission mechanism (not illustrated). The drive roller 2335a is rotationally driven by a conveyance drive unit (stepping motor) (not illustrated) via a conveyance drive transmission mechanism (not illustrated). The driven rollers 2331b to 2335b are accordingly rotated by the drive rollers 2331a to 2335a, respectively. Here, all the drive rollers 2331a to 2335a of the first feed rollers 2331 to the fifth feed rollers 2335 have the same diameter (specifically, 18 mm). All the driven rollers 2331b, 2332b, and 2335b of the first feed rollers 2331, the second feed rollers 2332, and the fifth feed rollers 2335 have the same diameter (specifically, 18 mm). Both the driven rollers 2333b and 2334b of the third feed rollers 2333 and the fourth feed rollers 2334 have the same diameter (10 mm) that is smaller than the diameter of the other driven rollers 2331b, 2332b, and 2335b.

Specifically, the first feed rollers 2331 to the fifth feed rollers 2335 are arranged along the conveyance path 231 (the pair of conveyance guides 232) in this order from the upstream side to the downstream side in the conveying direction H of the document G.

The first feed rollers 2331 and the second feed rollers 2332 are registration rollers to bring the leading edge of the document G, conveyed from the supply roller 222, into contact with the first feed rollers 2331 for alignment, further bring the leading edge of the document G, conveyed from the first feed rollers 2331, into contact with the second feed rollers 2332 for alignment again, and then convey the document G to the third feed rollers 2333. The image reading timing is determined by detecting the leading edge of the document G by a detection unit (reflective sensor) provided in the conveyance path between the second feed rollers 2332 and the third feed rollers 2333.

In at least either one of the pair of first upstream conveyance rollers (2333) and the pair of first downstream conveyance rollers (2334), at least the plurality of driven rollers (2333b or 2334b) is arranged at predetermined intervals in the rotation axis direction W. Specifically, in the first feed rollers 2331 to the fifth feed rollers 2335, the drive rollers 2331a to 2335a and the driven rollers 2331b to 2335b are provided in the rotation axis direction W. The roller at the center area among the individual rollers arranged as the drive rollers 2331a to 2335a and the driven rollers 2331b to 2335b is located at the center area (see FIG. 4B) of the document conveyance area α in the rotation axis direction W. This makes it possible to convey the document G having the smallest size at the center area of the document conveyance area α in the rotation axis direction W.

The document discharge unit 240 includes a pair of discharge rollers 241. The pair of discharge rollers 241 includes a drive roller 241a and a driven roller 241b. The drive roller 241a is rotationally driven by a conveyance drive unit via a conveyance drive transmission mechanism. The driven roller 241b is accordingly rotated by the drive roller 241a.

In the document feed device 200, in order to convey the thick document G (e.g., business card) having the smallest size, the rollers are provided in the conveyance path such that the distance between the adjacent rollers is smaller than the smallest size (e.g., business card size, a size of 89 mm in the conveying direction H). In this example, as illustrated in FIG. 3, a distance d1 between the intake roller 221 and the supply roller 222, a distance d2 between the supply roller 222 and the first feed rollers 2331, a distance d3 between the first feed rollers 2331 and the second feed rollers 2332, a distance d4 between the second feed rollers 2332 and the third feed rollers 2333, a distance d5 between the third feed rollers 2333 and the fourth feed rollers 2334, a distance d6 between the fourth feed rollers 2334 and the fifth feed rollers 2335, and a distance d7 between the fifth feed rollers 2335 and the discharge roller 241 are 35.0 mm, 76.3 mm, 74.6 mm, 74.5 mm, 78.5 mm, 80.3 mm, and 70.6 mm, respectively.

As illustrated in FIG. 7, in the first feed rollers 2331 to the fifth feed rollers 2335, the driven rollers 2331b to 2335b are pressed against the drive rollers 2331a to 2335a by the biasing members 2331c to 2335c (specifically, spiral springs).

This is described below by using the third feed rollers 2333 illustrated in FIGS. 8A and 8B and the fourth feed rollers 2334 illustrated in FIGS. 9A and 9B as examples.

As illustrated in FIGS. 8A and 8B, the drive rollers 2333a in the third feed rollers 2333 are rotationally supported by a main body frame (not illustrated) of the document feed device 200. The driven rollers 2333b in the third feed rollers 2333 are rotationally supported by a rotation shaft Q1 that is supported by support members 2333d. The support members 2333d are rotationally supported around a rotation axis β by a rotation shaft (not illustrated) secured to the main body frame (not illustrated) of the document feed device 200. The biasing members 2333c apply a biasing force to the driven rollers 2333b such that the driven rollers 2333b are pressed against the drive rollers 2333a. The biasing members 2333c are provided in the space with the main body frame (not illustrated) on the opposite side of the driven rollers 2333b with the rotation axis β of the support members 2333d interposed therebetween.

As illustrated in FIGS. 9A and 9B, the drive rollers 2334a in the fourth feed rollers 2334 are rotationally supported by the main body frame (not illustrated) of the document feed device 200. The driven rollers 2334b in the fourth feed rollers 2334 are rotationally supported by a rotation shaft Q2 that is supported by the support member 2334d (see FIG. 9B). The biasing members 2334c apply a biasing force to the driven rollers 2334b such that the driven rollers 2334b are pressed against the drive rollers 2334a. The biasing members 2334c are attached to the support members 2333d so as to bias the rotation shaft Q2 toward the drive rollers 2334a.

In a conventional configuration, the load of an individual driven roller in the rotation axis direction is set to the value for allowing a thick document having the smallest size to be conveyed, i.e., a value larger than the value for conveying a standard document (e.g., regular sheet) having a size larger than the smallest size, and all the loads are set to be identical. This results in a reduction in the conveyance performance for standard documents (e.g., regular sheets) having a size larger than the smallest size (e.g., business card size).

In this regard, according to the present embodiment, as illustrated in FIG. 10, in at least either one (both (2333 and 2334) in this example) of the pair of first upstream conveyance rollers (2333) and the pair of first downstream conveyance rollers (2334), a first pressure load Fa (13.5 N in this example) of central driven rollers (2333x and 2334x), which are located at the center area in the rotation axis direction W, against the drive rollers 2333a and 2334a is larger than a second pressure load Fb (2.5 N in this example) of both-side driven rollers (2333y and 2334y), which are located at both sides of the central driven rollers (2333x and 2334x), against the drive rollers 2333a and 2334a.

Thus, it is possible to ensure the conveyance of the standard document G (e.g., regular sheet) having a size larger than the smallest size and also ensure the conveyance of the thick document G (e.g., business card) having the smallest size. Accordingly, the conveyance performance for the document G may be ensured regardless of the type and size of the document G.

In at least either one of the pair of first upstream conveyance rollers (2333) and the pair of first downstream conveyance rollers (2334), if the pressure load of the both-side driven rollers (2333y and 2334y) against the drive rollers 2333a and 2334a is too large, image blurring easily occurs when the trailing edge of the standard document G (e.g., regular sheet) having a size larger than the smallest size passes through the first upstream conveyance rollers (2333) or when the leading edge of the document G reaches the first downstream conveyance rollers (2334). Therefore, there is a need to reduce the occurrence of image blurring when the trailing edge of the standard document G (e.g., regular sheet) having a size larger than the smallest size passes through the first upstream conveyance rollers (2333) or when the leading edge of the document G reaches the first downstream conveyance rollers (2334).

In this regard, according to the present embodiment, in at least either one (both (2333 and 2334) in this example) of the pair of first upstream conveyance rollers (2333) and the pair of first downstream conveyance rollers (2334), the second pressure load Fb of the both-side driven rollers (2333y and 2334y) against the drive rollers 2333a and 2334a is smaller than a third pressure load Fc of the driven rollers (2331b, 2332b, and 2335b) against the drive rollers 2331a, 2332a, and 2335a in the pairs of second conveyance rollers (2331, 2332, and 2335) other than the pair of first upstream conveyance rollers (2333) and the pair of first downstream conveyance rollers (2334) among the plurality of pairs of conveyance rollers (2331 to 2335).

Accordingly, it is possible to reduce the occurrence of image blurring when the trailing edge of the standard document G (e.g., regular sheet) having a size larger than the smallest size passes through the first upstream conveyance rollers (2333) or when the leading edge of the document G reaches the first downstream conveyance rollers (2334).

According to the present embodiment, in at least either one (both (2333 and 2334) in this example) of the pair of first upstream conveyance rollers (2333) and the pair of first downstream conveyance rollers (2334), the first pressure load Fa (13.5 N in this example) of the central driven rollers (2333x and 2334x) against the drive rollers 2333a and 2334a is larger than the third pressure load Fc (5 N in this example) of the driven rollers (2331b, 2332b, and 2335b) against the drive rollers 2331a, 2332a, and 2335a in the pairs of second conveyance rollers (2331, 2332, and 2335).

Thus, it is possible to ensure the conveyance of the standard document G (e.g., regular sheet) having a size larger than the smallest size and also further ensure the conveyance of the thick document G (e.g., business card) having the smallest size. Accordingly, the conveyance performance for the document G may be ensured regardless of the type and size of the document G.

According to the present embodiment, in the pair of first upstream conveyance rollers (2333), the first pressure load Fa of the central driven roller 2333x, which is located at the center area in the rotation axis direction W, against the drive roller 2333a may be larger than the second pressure load Fb of the both-side driven rollers 2333y, which are located at both sides of the central driven roller 2333x, against the drive rollers 2333a and, in the pair of first downstream conveyance rollers (2334), all of fourth pressure loads of the driven rollers 2334b against the drive rollers 2334a may be equal or substantially equal and may be loads (e.g., 3 N) that are larger than the second pressure load Fb (2.5 N in this example) and smaller than the third pressure load Fc (5 N in this example).

Thus, as all the fourth pressure loads of the driven rollers 2334b against the drive rollers 2334a in the pair of first downstream conveyance rollers (2334) are equal or substantially equal, the setting of the loads of the driven rollers 2334b against the drive rollers 2334a in the pair of first downstream conveyance rollers (2334) may be simplified, and accordingly the configuration for ensuring the conveyance performance for the document G regardless of the type and size of the document G may be simplified.

According to the present embodiment, in at least either one (both (2333 and 2334) in this example) of the pair of first upstream conveyance rollers (2333) and the pair of first downstream conveyance rollers (2334), the diameters of the driven rollers 2333b and 2334b are smaller than the diameters of the driven rollers (2331b, 2332b, and 2335b) in the pairs of second conveyance rollers (2331, 2332, and 2335).

This makes it possible to reduce the angle of the conveyance path 231 at the area where the document G enters the read position R from the pair of first upstream conveyance rollers (2333). Thus, the document G may be smoothly conveyed from the pair of first upstream conveyance rollers (2333) to the read position R. Furthermore, it is possible to reduce the angle of the conveyance path 231 at the area where the document G is moved from the read position R to the pair of first downstream conveyance rollers (2334). Thus, the document G may be smoothly conveyed from the read position R to the pair of first downstream conveyance rollers (2334).

Second Embodiment

According to a second embodiment, the same component as that in the first embodiment is denoted by the same reference numeral, and the point different from the first embodiment is primarily described.

Figure 11:
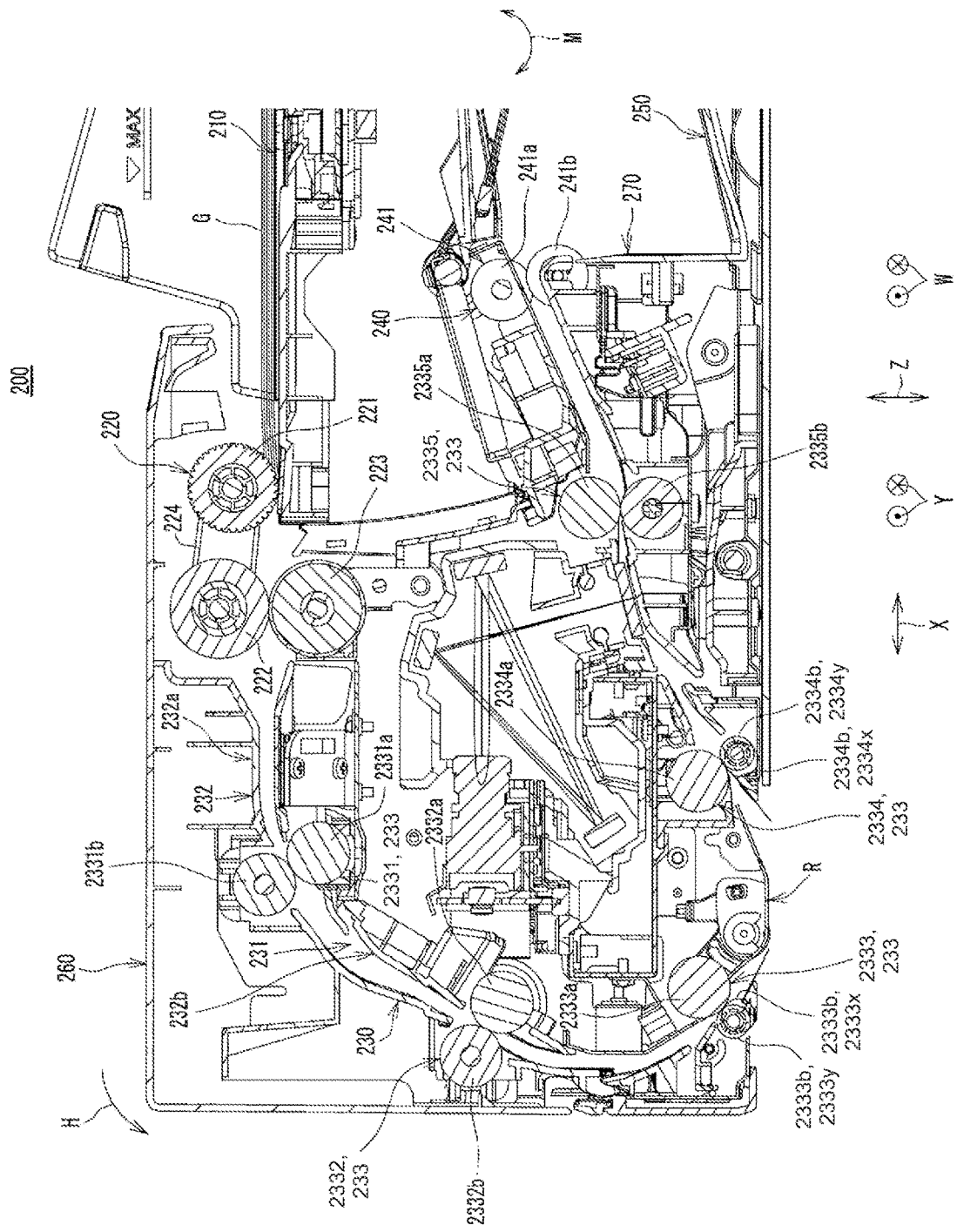
FIG. 11 is an enlarged cross-sectional view illustrating an enlarged part at the conveyance path in the document feed device according to a second embodiment.
Figure 12:
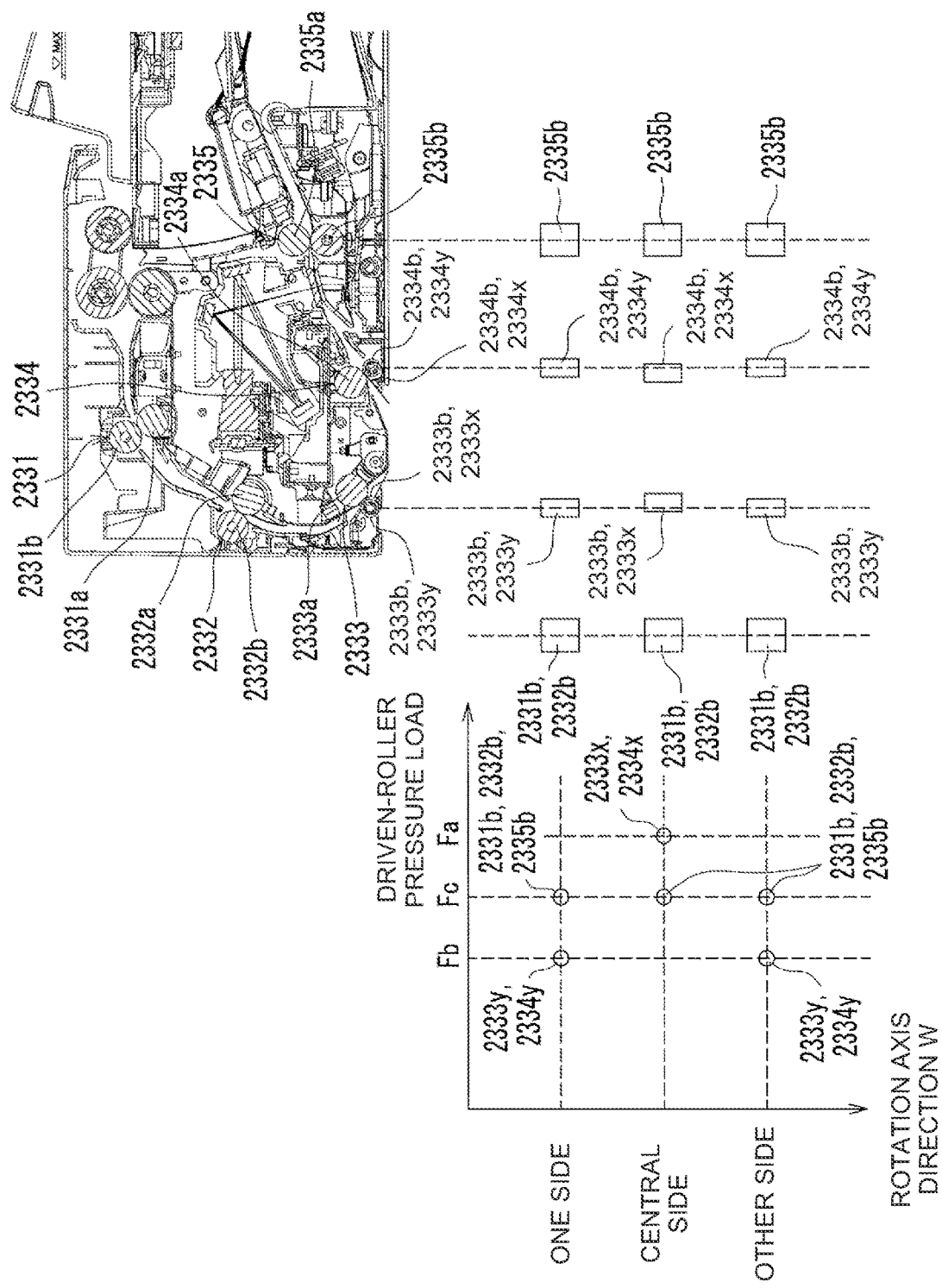
FIG. 12 is a schematic view illustrating a net of the driven roller in the pair of first upstream conveyance rollers, the driven roller in the pair of first downstream conveyance rollers, and the driven rollers in the pairs of second conveyance rollers together with a graph of loads.

FIG. 11 is an enlarged cross-sectional view illustrating an enlarged part at the conveyance path 231 in the document feed device 200 according to the second embodiment. FIG. 12 is a schematic view illustrating a net of the driven roller 2333b in the pair of first upstream conveyance rollers (2333), the driven roller 2334b in the pair of first downstream conveyance rollers (2334), and the driven rollers (2331b, 2332b, and 2335b) in the pairs of second conveyance rollers (2331, 2332, and 2335) together with a graph of loads.

According to the second embodiment, in the pair of first upstream conveyance rollers (2333), the pressure position of the central driven roller 2333x against the drive roller 2333a is located downstream of the pressure position of the both-side driven rollers 2333y against the drive roller 2333a in the conveying direction H.

Thus, it is possible to reduce the occurrence of image blurring when the trailing edge of the standard document G (e.g., regular sheet) having a size larger than the smallest size passes through the first upstream conveyance rollers (2333) or when the leading edge of the document G reaches the first downstream conveyance rollers (2334). Furthermore, the document G may be conveyed by both the first upstream conveyance rollers (2333) and the first downstream conveyance rollers (2334) for as much time as possible. Thus, the thick document G (e.g., business card) having the smallest size may be read in a stable manner.

In the pair of first downstream conveyance rollers (2334), the pressure position of the central driven roller 2334x against the drive roller 2334a is located upstream of the pressure position of the both-side driven rollers 2334y against the drive roller 2334a in the conveying direction H.

Thus, it is possible to reduce the occurrence of image blurring when the trailing edge of the standard document G (e.g., regular sheet) having a size larger than the smallest size passes through the first upstream conveyance rollers (2333) or when the leading edge of the document G reaches the first downstream conveyance rollers (2334). Furthermore, the document G may be conveyed by both the first upstream conveyance rollers (2333) and the first downstream conveyance rollers (2334) for as much time as possible. Thus, the thick document G (e.g., business card) having the smallest size may be read in a stable manner.

In either case, the amount of shift in a circumferential direction M between the central driven rollers 2333x, 2334x and the both-side driven rollers 2333y, 2334y may be, for example, in a range (e.g., approximately 1 mm to 3 mm) in which each other's nip areas are at least overlapped.

According to the present embodiment, in the pair of first upstream conveyance rollers (2333), the pressure position of the both-side driven rollers 2333y against the drive roller 2333a may be located downstream of the pressure position of the central driven roller 2333x against the drive roller 2333a in the conveying direction H.

Thus, it is possible to reduce the occurrence of image blurring when the trailing edge of the standard document G (e.g., regular sheet) having a size larger than the smallest size passes through the first upstream conveyance rollers (2333) or when the leading edge of the document G reaches the first downstream conveyance rollers (2334).

In the pair of first downstream conveyance rollers (2334), the pressure position of the both-side driven rollers 2334y against the drive roller 2334a may be located upstream of the pressure position of the central driven roller 2334x against the drive roller 2334a in the conveying direction H.

Thus, it is possible to reduce the occurrence of image blurring when the trailing edge of the standard document G (e.g., regular sheet) having a size larger than the smallest size passes through the first upstream conveyance rollers (2333) or when the leading edge of the document G reaches the first downstream conveyance rollers (2334).

In either case, the amount of shift in the circumferential direction M between the central driven rollers 2333x, 2334x and the both-side driven rollers 2333y, 2334y may be, for example, in a range (e.g., approximately 1 mm to 3 mm) in which each other's nip areas are at least overlapped.

Third Embodiment

According to a third embodiment, the same component as that in the first embodiment and the second embodiment are denoted by the same reference numeral, and the point different from the second embodiment is primarily described.

Figure 13A:
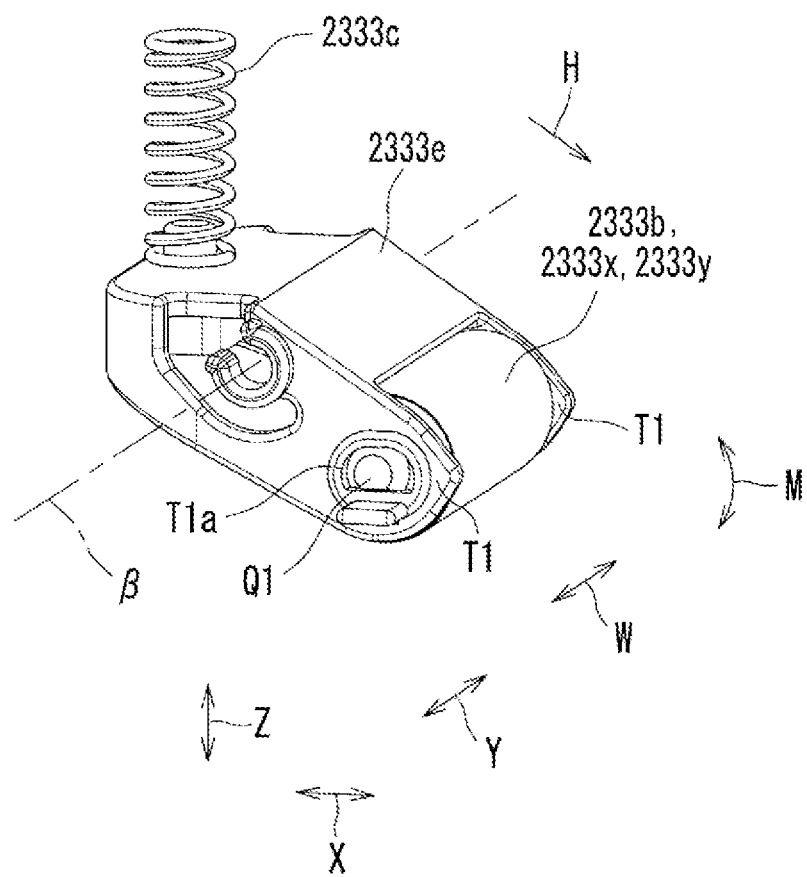
FIG. 13A is a perspective view illustrating a state where the driven roller in the pair of first upstream conveyance rollers is located at a first position on the upstream side in a conveying direction in a support member according to a third embodiment.
Figure 13B:
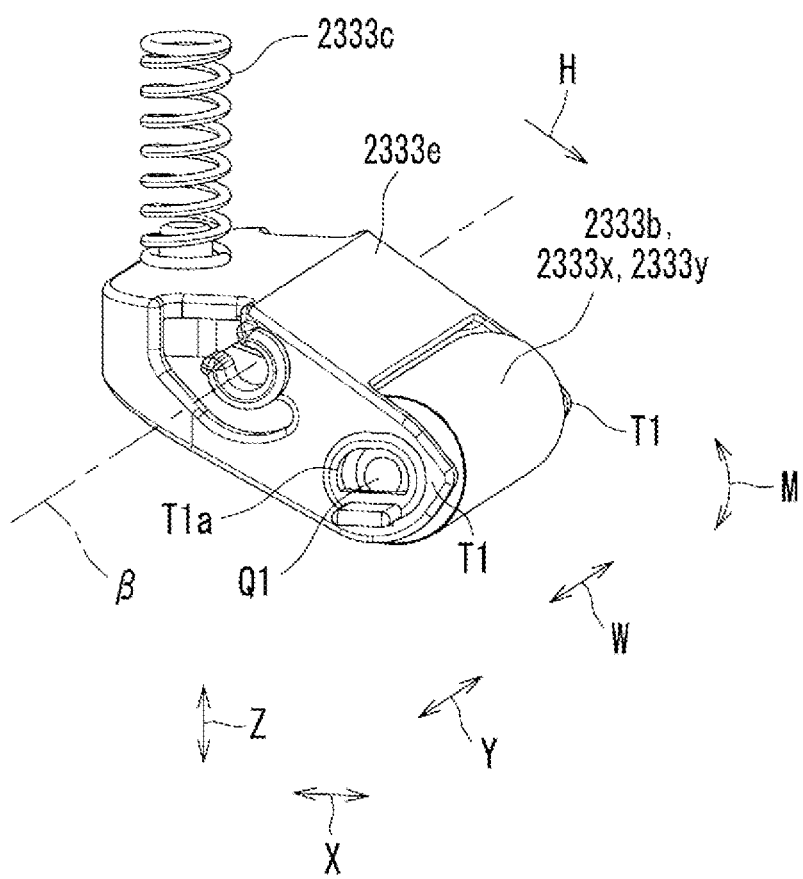
FIG. 13B is a perspective view illustrating a state where the driven roller in the pair of first upstream conveyance rollers is located at a second position on the downstream side in the conveying direction in the support member according to the third embodiment.
Figure 13C:
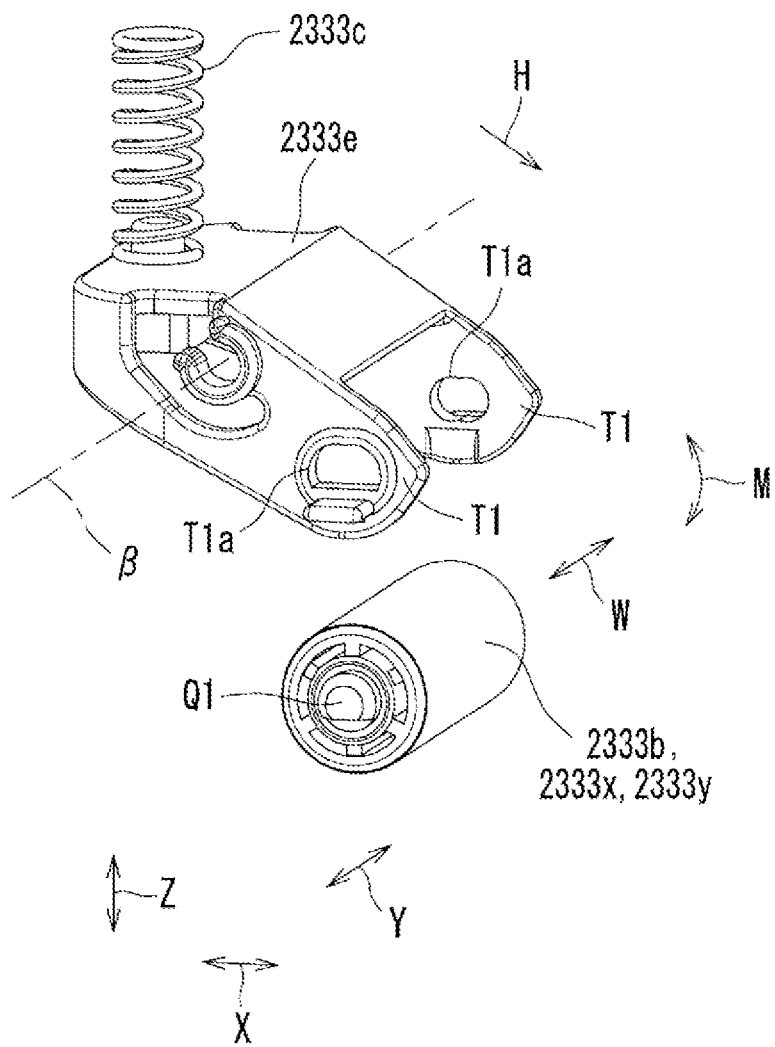
FIG. 13C is an exploded perspective view illustrating a state where the driven roller is removed from the support member illustrated in FIGS. 13A and 13B.

FIGS. 13A and 13B are perspective views illustrating states where the driven roller 2333b in the pair of first upstream conveyance rollers (2333) is located at a first position on the upstream side and a second position on the downstream side, respectively, in the conveying direction H in a support member 2333e according to the third embodiment. FIG. 13C is an exploded perspective view illustrating a state where the driven roller 2333b is removed from the support member 2333e illustrated in FIGS. 13A and 13B.

Figure 14A:
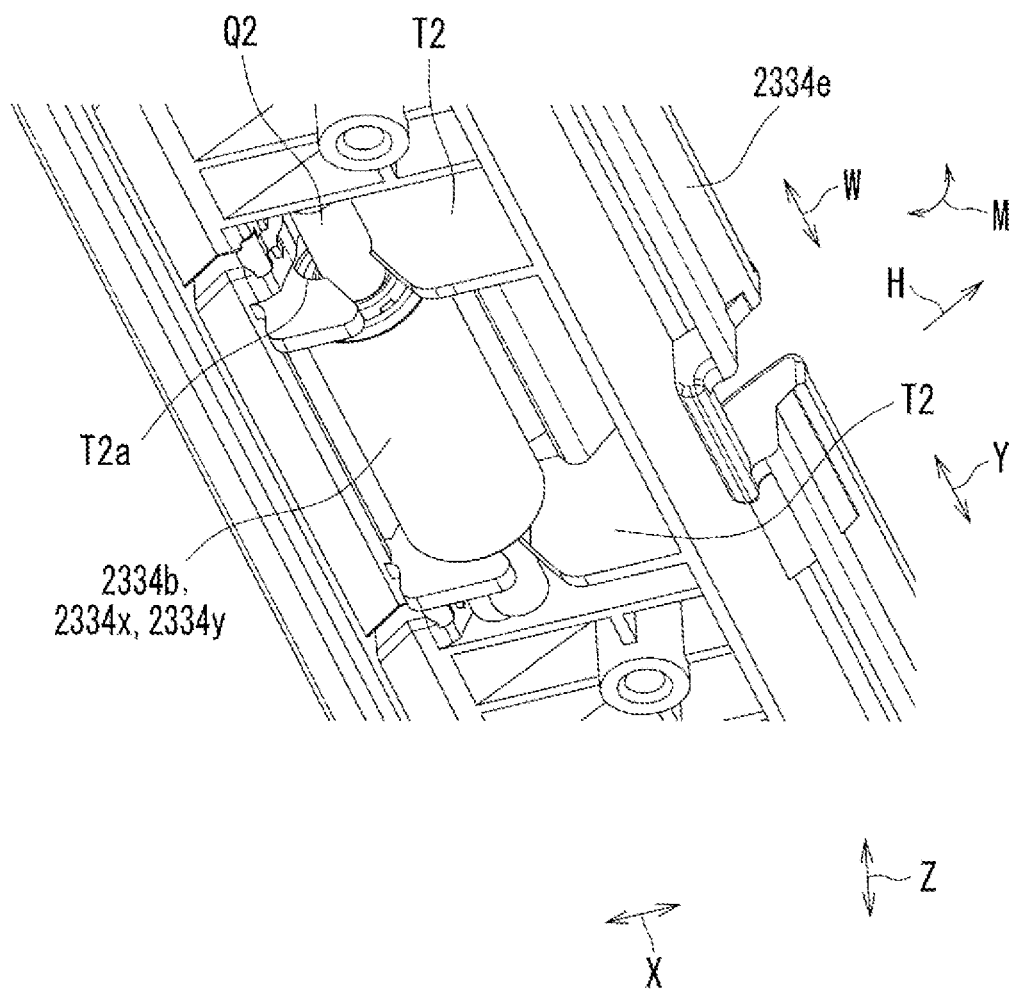
FIG. 14A is a schematic view illustrating a state where the driven roller in the pair of first downstream conveyance rollers is located at the first position on the upstream side in the conveying direction in a support member according to the third embodiment.
Figure 14B:
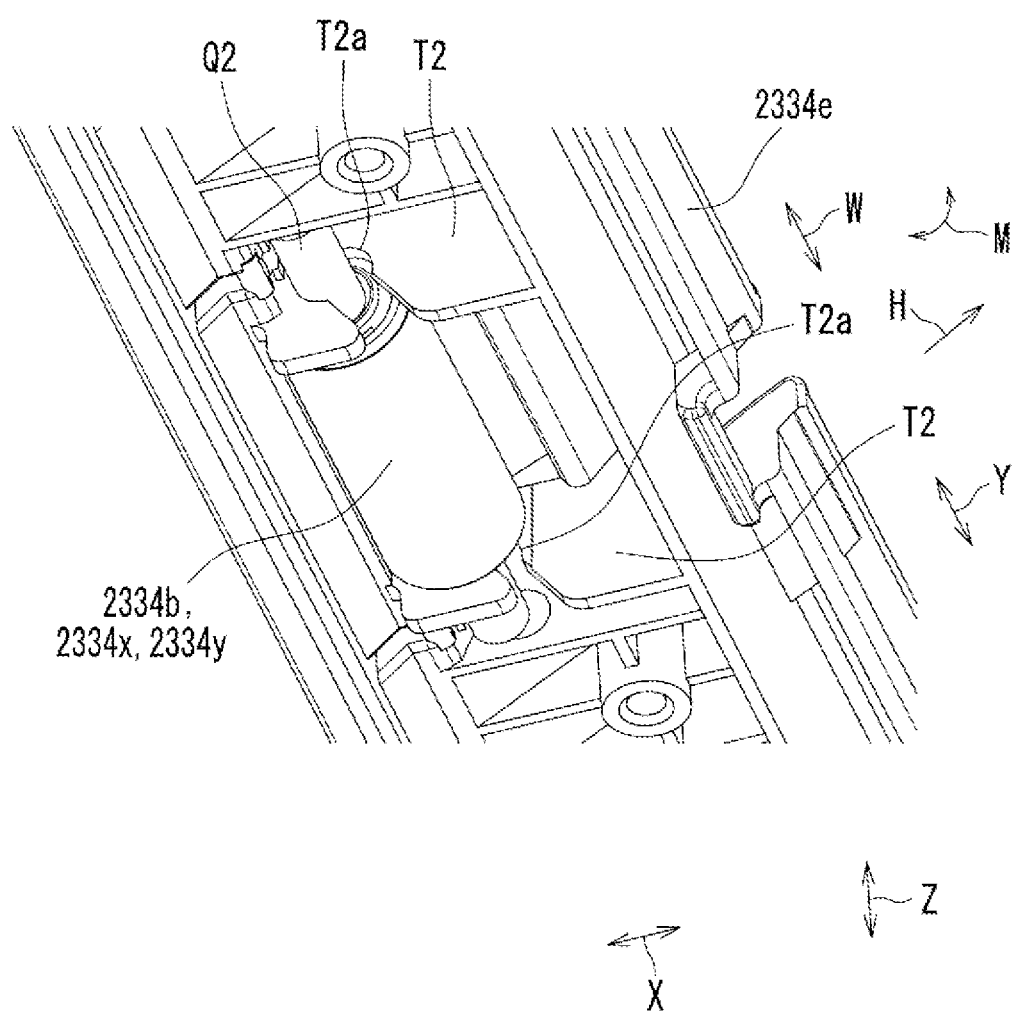
FIG. 14B is a schematic view illustrating a state where the driven roller in the pair of first downstream conveyance rollers is located at the second position on the downstream side in the conveying direction in the support member according to the third embodiment.
Figure 14C:
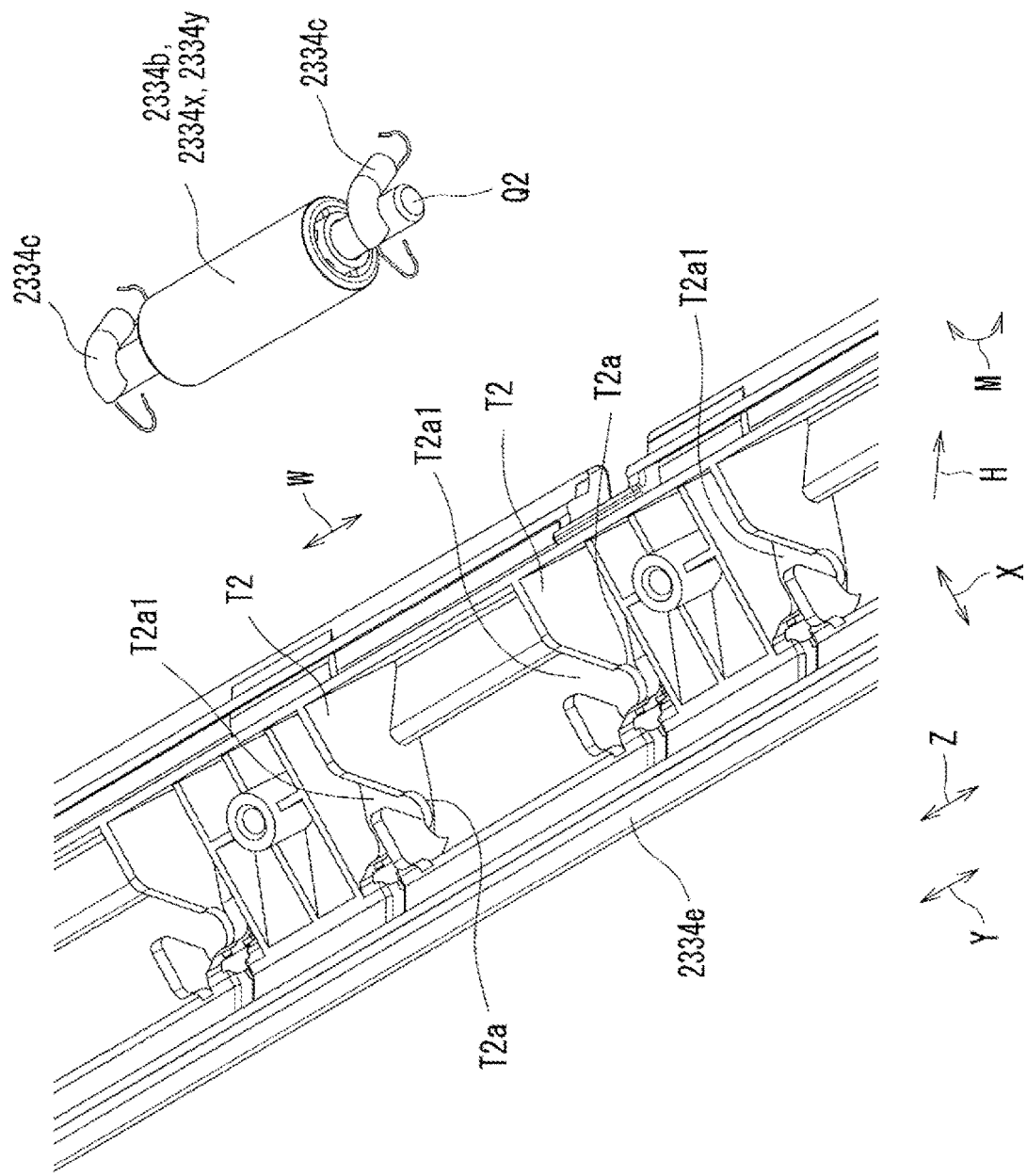
FIG. 14C is an exploded perspective view illustrating a state where the driven roller is removed from the support member illustrated in FIGS. 14A and 14B.

FIGS. 14A and 14B are schematic views illustrating states where the driven roller 2334b in the pair of first downstream conveyance rollers (2334) is located at the first position on the upstream side and the second position on the downstream side, respectively, in the conveying direction H in a support member 2334e according to the third embodiment. FIG. 14C is an exploded perspective view illustrating a state where the driven roller 2334b is removed from the support member 2333e illustrated in FIGS. 14A and 14B. The biasing member 2334c is not illustrated in FIGS. 14A and 14B.

The document feed device 200 according to the third embodiment includes the support members 2333e and 2334e instead of the support members 2333d and 2334d. The support members 2333e and 2334e support the driven rollers 2333b and 2334b so as to be mounted at the plurality of pressure positions against the drive rollers 2333a and 2334a, respectively. Specifically, the both-side driven rollers 2333y and 2334y and/or the central driven rollers 2333x and 2334x may be mounted in the support members 2333e and 2334e at the plurality of pressure positions against the drive rollers 2333a and 2334a, respectively.

Specifically, as illustrated in FIGS. 13A to 13C, the driven roller 2333b is rotatable about the rotation shaft Q1. Support plates T1 are provided on both sides of the support member 2333e in the rotation axis direction W. The support plates T1 include through holes T1a, respectively, which support the rotation shaft Q1 of the driven roller 2333b at the first position and the second position that are different in the circumferential direction M of the drive roller 2333a. In this example, the through hole T1a is formed to have a shape (the shape of the number 8) where circles or arcs having the same diameter are overlapped (see FIG. 13C). The rotation shaft Q1 of the driven roller 2333b is fitted into the first position (see FIG. 13A) or the second position (see FIG. 13B) of the through holes T1a by bending the support plates T1 outwardly in the rotation axis direction W.

As illustrated in FIGS. 14A to 14C, the driven roller 2334b is rotatable about the rotation shaft Q2. Support plates T2 are provided on both sides of the support member 2334e in the rotation axis direction W of the driven roller 2334b. The support plates T2 include through holes T2a, respectively, which support the rotation shaft Q2 of the driven roller 2334b at the first position and the second position that are different in the circumferential direction M of the drive roller 2334a. In this example, the through hole T2a is formed to have the shape of the number 8 (see FIG. 14C). The through hole T2a includes an opening portion T2a1 that has an opening on the opposite side of the drive roller 2334a. The rotation shaft Q2 of the driven roller 2334b is inserted through the opening portions T2a1 and, due to the bending of the peripheral edges of the through holes T2a of the support plates T2, is fitted into the first position (see FIG. 14A) or the second position (see FIG. 14B) of the through holes T2a.

This eliminates the need to produce multiple types of support members for changing the pressure positions of the both-side driven rollers 2333y and 2334y and the central driven rollers 2333x and 2334x against the drive rollers 2333a and 2334a. That is, the pressure positions against the drive rollers 2333a and 2334a may be easily switched by the both-side driven rollers 2333y and 2334y and the central driven rollers 2333x and 2334x without producing multiple types of support members.

The present invention is not limited to the embodiments described above and may be implemented in other various forms. Therefore, the embodiments are merely examples in all respects and should not be interpreted in a limited way. The scope of the present invention is indicated by the scope of claims and is not bound by the text of the description. Further, all modifications and changes belonging to the scope equivalent to the scope of claims fall within the scope of the present invention.

What is claimed is:

1. A document feed device comprising a plurality of pairs of conveyance rollers provided to convey a document along a conveyance path having a read position for reading an image of the document, wherein
    the plurality of pairs of conveyance rollers includes a drive roller that is rotationally driven and a driven roller that is accordingly rotated by the drive roller and includes, in a conveying direction of the document, a pair of first upstream conveyance rollers located closest to the read position on an upstream side and a pair of first downstream conveyance rollers located closest to the read position on a downstream side,
    in at least either one of the pair of first upstream conveyance rollers and the pair of first downstream conveyance rollers, at least the driven roller includes a plurality of driven rollers provided in a rotation axis direction,
    a first pressure load of a central driven roller, which is located in a center area in the rotation axis direction, against the drive roller is larger than a second pressure load of both-side driven rollers, which are located at both sides of the central driven roller, against the drive rollers, and
    the second pressure load of the both-side driven rollers against the drive rollers is smaller than a third pressure load of the driven roller against the drive roller in a pair of second conveyance rollers other than the pair of first upstream conveyance rollers and the pair of first downstream conveyance rollers among the plurality of pairs of conveyance rollers.

2. The document feed device according to claim 1, wherein, in at least either one of the pair of first upstream conveyance rollers and the pair of first downstream conveyance rollers, the first pressure load of the central driven roller against the drive roller is larger than the third pressure load of the driven roller against the drive roller in the pair of second conveyance rollers.

3. The document feed device according to claim 1, wherein, in at least either one of the pair of first upstream conveyance rollers and the pair of first downstream conveyance rollers, a diameter of the driven roller is smaller than a diameter of the driven roller in the pair of second conveyance rollers.

4. The document feed device according to claim 1, wherein, in the pair of first upstream conveyance rollers, a pressure position of the central driven roller against the drive roller is located downstream of pressure positions of the both-side driven rollers against the drive rollers in the conveying direction.

5. The document feed device according to claim 1, wherein, in the pair of first downstream conveyance rollers, a pressure position of the central driven roller against the drive roller is located upstream of pressure positions of the both-side driven rollers against the drive rollers in the conveying direction.

6. The document feed device according to claim 1, wherein, in the pair of first upstream conveyance rollers, pressure positions of the both-side driven rollers against the drive rollers are located downstream of a pressure position of the central driven roller against the drive roller in the conveying direction.

7. The document feed device according to claim 1, wherein, in the pair of first downstream conveyance rollers, pressure positions of the both-side driven rollers against the drive rollers are located upstream of a pressure position of the central driven roller against the drive roller in the conveying direction.

8. The document feed device according to claim 4, further comprising a support member that supports the driven roller so as to be mounted at a plurality of pressure positions against the drive roller.

9. An image forming apparatus comprising the document feed device according to claim 1.

* * * * *